US006529604B1

(12) United States Patent
Park et al.

(10) Patent No.: US 6,529,604 B1
(45) Date of Patent: Mar. 4, 2003

(54) SCALABLE STEREO AUDIO ENCODING/ DECODING METHOD AND APPARATUS

(75) Inventors: Sung-hee Park, Seoul (KR); Yeon-bae Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/106,016

(22) Filed: Jun. 29, 1998

(30) Foreign Application Priority Data

Nov. 20, 1997 (KR) ........................................... 97-61605

(51) Int. Cl.[7] ................................................ H04R 5/00

(52) U.S. Cl. ............................ 381/22; 381/23; 700/94

(58) Field of Search ............................... 381/1, 22, 23; 700/94; 704/500; 341/55

(56) References Cited

U.S. PATENT DOCUMENTS

| | | | | | |
|---|---|---|---|---|---|
| 5,291,557 | A | * | 3/1994 | Davis et al. | 381/22 |
| 5,613,035 | A | | 3/1997 | Kim | |
| 5,632,005 | A | * | 5/1997 | Davis et al. | 381/23 |
| 5,649,053 | A | * | 7/1997 | Kim | 704/500 |
| 5,694,332 | A | * | 12/1997 | Maturi | 700/94 |
| 5,893,066 | A | * | 4/1999 | Hong | 704/500 |
| 5,910,995 | A | * | 6/1999 | Mercs et al. | 381/23 |
| 5,982,830 | A | * | 11/1999 | Maturi et al. | 375/366 |
| 6,011,496 | A | * | 1/2000 | Park et al. | 341/55 |
| 6,023,490 | A | * | 2/2000 | TenKate | 381/23 |
| 6,108,584 | A | * | 8/2000 | Edwards | 381/22 |
| 6,122,618 | A | * | 9/2000 | Park | 704/500 |
| 6,148,288 | A | * | 11/2000 | Park | 704/500 |
| 6,252,965 | B1 | * | 6/2001 | Beard | 381/23 |
| 6,295,009 | B1 | * | 9/2001 | Goto | 341/50 |
| 6,349,284 | B1 | * | 2/2002 | Park et al. | 704/500 |

OTHER PUBLICATIONS

Steve Vernon, "Design and Implementation of AC–3 Coders," Dolby Laboratories, Inc., San Francisco, CA, Institute of Electrical and Electronics Engineers, published in *IEEE Tr. Consumer Electronics*, vol. 41, No. 3, Aug. 1995 (6 pages).

Craig C. Todd et al., "AC–3: Flexible Perceptual Coding for Audio Transmission and Storage," Dolby Laboratories, San Francisco, CA, Audio Engineering Society, Inc., presented at the 96th Convention, Feb. 26, 1994–Mar. 1, 1994 (13 pages).

(List continued on next page.)

*Primary Examiner*—Xu Mei
(74) *Attorney, Agent, or Firm*—Burns, Doane, Swecker & Mathis, LLP

(57) ABSTRACT

A scalable stereo audio encoding/decoding method and apparatus are provided. The method includes the steps of signal-processing input audio signals and quantizing the same for each predetermined coding band, coding the quantized data corresponding to the base layer among the quantized data, coding the quantized data corresponding to the next enhancement layer of the coded base layer and the remaining quantized data uncoded due to a layer size limit and belonging to the coded layer, and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a same predetermined number; and then arithmetic-coded using a predetermined probability model in the order ranging from the MSB sequences to the LSB sequences, bit-sliced left-channel data and right-channel data being alternately coded in units of predetermined vectors.

49 Claims, 4 Drawing Sheets

OTHER PUBLICATIONS

Mark F. Davis, "The AC–3 Multichannel Coder," Dolby Laboratories Inc., San Francisco, CA, Audio Engineering Society, Inc., presented at the 95$^{th}$ Convention, Oct. 7–10, 1993 (6 pages).

Karlheinz Brandenburg et al., "First Ideas on Scalable Audio Coding," Audio Engineering Society, presented at the 97$^{th}$ Convention, San Francisco, CA, Nov. 10–13, 1994 (cover page, pp. 1–8).

Bernhard Grill et al., "A Two– or Three–Stage Bit Rate Scalable Audio Coding System," Audio Engineering Society, presented at the 99$^{th}$ Convention, New York, N.Y., Oct. 6–9, 1995 (cover page, pp. 1–8).

"Digital Audio Compression Standard (AC–3)," Advanced Television Systems Committee Standard, Dec. 20, 1995.

"Dolby Digital Professional Encoding Manual," S97/11811, Dolby Laboratories, Inc., Dec. 22, 1997.

International Standard ISO/IEC 11172–3, "Information technology—Coding of moving pictures and associated audio for digital storage media at up to about 1,5 Mbit/s –," Part 3: Audio, First Edition, Aug. 1, 1993.

Sung–hee Park et al., "Multi–layer Bit–sliced Bit–Rate Scalable Audio Coding," 103$^{rd}$ AES Convention: Audio Engineering Society Preprint, Dec. 12, 1997, pp. 1–11.

Marina Bosi et al., "ISO/IEC MPEG–2 Advanced Audio Coding, "Journal of the Audio Engineering Society, US, Audio Engineering Society, New York, vol. 45, No. 10, Oct. 1, 1997, pp. 789–812.

A. Jain et al., "Scalable Compression For Image Browsing," IEEE Transactions on Consumer Electronics, US, IEEE Inc., New York, vol. 40, No. 3, Aug. 1, 1994, pp. 394–403.

* cited by examiner

SCALABLE STEREO AUDIO ENCODING/ DECODING METHOD AND APPARATUS

This application claims priority under 35 U.S.C. §§119 and/or 365 to 97-61605 filed in Korea on Nov. 20. 1997; the entire content of which is hereby incorporated by reference.

BACKGROUND OF THE INVENTION

1. Field of the Invention

The present invention relates to audio encoding and decoding, and more particularly, to a scalable stereo audio encoding/decoding method and apparatus using bit-sliced arithmetic coding.

2. Description of the Related Art

In a conventional scalable audio encoding/decoding apparatus, scalability of a 1-channel mono signal was taken into consideration [K. Brandenbrug, et. al., "First Ideas on Scalable Audio Coding", 97th AES-Convention, preprint 3924, San Francisco, 1994] and [K. Brandenburg, et al., "A two- or Three-Stage Bit Rate Scalable Audio Coding Sustem", 99th AES-Convention, preprint 4132, New York, 1995]. However, MPEG audio standards [MPEG Committee ISO/IEC/JTCI/SC29/WG11, Information technology—Coding of moving pictures and associated audio for data storage media to about 1.5 Mbit/s—Part 3: Audio, ISO/IEC IS 11172-3, 1998] or AC-2/AC-3 methods [Dolby, "Dolby AC-3 Multi-Channel Audio Coding—Submission to the Grand Alliance Audio Specialist Group", Dolby Lab., August, 1993] provide a technology for processing stereo and multi-channel signals as well as mono signals. In practice, most musical signals are composed of stereo signals. Thus, it is necessary to employ scalable audio codec adoptable to signals composed of two or more channel bitstreams as in the Internet or communications network.

Generally, musical signals are stereo signals. The stereo signals are provided through a compact disc (CD), a communications network or a broadcast network, and will be provided under multimedia environments in the future. However, existing scalable audio codecs have mostly treated mono signals and have not yet processed stereo signals. To process stereo signals, signal transmission must be performed such that all signals for one channel are transmitted and signals for another channel are then transmitted. In this case, however, since the quantities of bits generated in two channels are not always the same, the performance of scalable audio codec is considerably lower at a lower bitrate for the stereo signals.

SUMMARY OF THE INVENTION

To solve the above problems, it is an objective of the present invention to provide a scalable stereo digital audio data encoding method and apparatus, and a recording medium for recording the encoding method. Encoding is performed by generating bitstreams comprised of several enhancement layers based on a base layer using a bit-sliced arithmetic coding (BSAC) technique.

To achieve the objective of the present invention, there is provided scalable stereo audio encoding method for coding audio signals into a layered datastream having a base layer and at least two enhancement layers, including the steps of: signal-processing input audio signals and quantizing the same for each predetermined coding band, coding the quantized data corresponding to the base layer among the quantized data, coding the quantized data corresponding to the next enhancement layer of the coded base layer and the remaining quantized data uncoded due to a layer size limit and belonging to the coded layer, and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a same predetermined number, and then arithmetic-coded using a predetermined probability model in the order ranging from the Most Significant Bit (MSB) sequences to the Least Significant Bit (LSB) sequences, bit-sliced left-channel data and right-channel data being alternately coded in units of predetermined vectors. The side information includes at least scale factors and information on a probability model to be used in arithmetic coding. The predetermined vectors are four-dimensional vectors produced by coupling the four bit-sliced audio channel data into one vector. The four-dimensional vectors are divided into two subvectors according to prestates indicating whether non-zero bit-sliced frequency components are coded or not, to then be coded.

Also, the step of coding the scale factors includes the steps of obtaining the maximum scale factor, obtaining the difference between the maximum scale factor and the first scale factors and arithmetic-coding the difference, and obtaining differences between the immediately previous arithmetic-coded scale factor and the respective scale factors subsequent to the first scale factor, mapping the differences into a predetermined value and arithmetic-coding the mapped values.

The step of coding the scale factors includes the steps of obtaining the maximum scale factor, and obtaining differences between the maximum scale factor and the respective scale factors and arithmetic-coding the differences.

The header information commonly used for all bands is coded and the side information and the quantized frequencies necessary for the respective layer are formed by bit-sliced information to then be coded to have a layered structure.

The quantization is performed by the steps of converting the input audio signals of a time domain into signals of a frequency domain, coupling the converted signals as signals of predetermined scale factor bands by time/frequency mapping and calculating a masking threshold at each scale factor band, performing temporal-noise shaping for controlling the temporal shape of the quantization noise within each window for conversion, performing intensity stereo processing such that only the quantized information of a scale factor band for one of two channels is coded, and only the scale factor for the other channel is transmitted, predicting frequency coefficients of the present frame, performing Mid/Side (M/S) stereo processing for converting a left-channel signal and a right-channel signal into an additive signal of two signals and a subtractive signal thereof, and quantizing the signals for each predetermined coding band so that quantization noise of each band is smaller than the masking threshold.

When the quantized data is composed of sign data and magnitude data, the steps of coding of the base layer and enhancement layers and forming bitstreams include the steps of: arithmetic-coding the most significant digit sequences composed of most significant digits of the magnitude data, coding sign data corresponding to non-zero data among the coded most significant digit sequences, coding the most significant digit sequences among uncoded magnitude data of the digital data, coding uncoded sign data among the sign data corresponding to non-zero magnitude data among coded digit sequences, and performing the magnitude coding step and the sign coding step on the respective digits of the digital data, the respective steps being alternately performed on the left-channel data and the right-channel data in units of predetermined vectors.

The scalable stereo audio decoding apparatus further includes an M/S stereo processing portion for performing M/S stereo processing for checking whether or not M/S stereo processing has been performed in the bitstream encoding method, and converting a left-channel signal and a right-channel signal into an additive signal of two signals and a subtractive signal thereof if the M/S stereo processing has been performed, a predicting portion for checking whether or not predicting step has been performed in the bitstream encoding method, and predicting frequency coefficients of the current frame if the checking step has been performed, an intensity stereo processing portion for checking whether or not intensity stereo processing has been performed in the bitstream encoding method, and, if the intensity stereo processing has been performed, then since only the quantized information of the scale factor band for one channel (the left channel) two channels is coded, performing the intensity stereo processing for restoring the quantized information of the other channel (the right channel) into a left channel value, and a temporal noise shaping (TNS) portion for checking whether or not temporal noise shaping step has been performed in the bitstream encoding method, and if the TNS step has been performed, performing temporal-noise shaping for controlling the temporal shape of the quantization noise within each window for conversion.

According to another aspect of the present invention, there is provided a scalable stereo audio coding apparatus including a quantizing portion for signal-processing input audio signals and quantizing the same for each coding band, a bit-sliced arithmetic-coding portion for coding bitstreams for all layers so as to have a layered structure, by band-limiting for a base layer so as to be scalable, coding side information corresponding to the base layer, coding the quantized information sequentially from the most significant bit sequence to the least significant bit sequence, and from lower frequency components to higher frequency components, alternately coding left-channel data and right-channel data in units of predetermined vectors, and coding side information corresponding to the next enhancement layer of the base layer and the quantized data, and a bitstream forming portion for collecting data formed in the quantizing portion and the bit-sliced arithmetic coding portion and generating bitstreams.

The quantizing portion includes a time/frequency mapping portion for converting the input audio signals of a temporal domain into signals of a frequency domain, a psychoacoustic portion for coupling the converted signals by signals of predetermined scale factor bands by time/frequency mapping and calculating a masking threshold at each scale factor band using a masking phenomenon generated by interaction of the respective signals, and a quantizing portion for quantizing the signals for each predetermined coding band while the quantization noise of each band is compared with the masking threshold. Also, the apparatus further includes a temporal noise shaping (TNS) portion for performing temporal-noise shaping for controlling the temporal shape of the quantization noise within each window for conversion, an intensity stereo processing portion for performing intensity stereo processing such that only the quantized information of a scale factor band for one of two channels is coded, and only the scale factor for the other channel is transmitted, a predicting portion for predicting frequency coefficients of the present frame, and an M/S stereo processing portion for performing M/S stereo processing for converting a left-channel signal and a right-channel signal into an additive signal of two signals and a subtractive signal thereof.

According to still another aspect of the present invention, there is provided a scalable stereo audio decoding method for decoding audio data coded to have layered bitrates, including the steps of analyzing data necessary for the respective modules in the bitstreams having a layered structure, decoding at least scale factors and arithmetic-coding model indices and quantized data, in the order of creation of the layers in bitstreams having a layered structure, the quantized data decoded alternately for the respective channels by analyzing the significance of bits composing the bitstreams, from upper significant bits to lower significant bits, restoring the decoded scale factors and quantized data into signals having the original magnitudes, and converting inversely quantized signals into signals of a temporal domain.

The scalable stereo audio decoding method further includes the steps of performing M/S stereo processing for checking whether or not M/S stereo processing has been performed in the bitstream encoding method, and converting a left-channel signal and a right-channel signal into an additive signal of two signals and a subtractive signal thereof if the M/S stereo processing has been performed, checking whether or not a predicting step has been performed in the bitstream encoding method, and predicting frequency coefficients of the current frame if the checking step has been performed, checking whether or not an intensity stereo processing step has been performed in the bitstream encoding method, and, if the intensity stereo processing has been performed, then since only the quantized information of the scale factor band for one channel (the left channel) two channels is coded, performing the intensity stereo processing for restoring the quantized information of the other channel (the right channel) into a left channel value, and checking whether or not a temporal noise shaping (TNS) step has been performed in the bitstream encoding method, and if the TNS step has been performed, performing temporal-noise shaping for controlling the temporal shape of the quantization noise within each window for conversion.

When the quantized data is composed of sign data and magnitude data, restoring quantized frequency components by sequentially decoding the magnitude data of quantized frequency components sign bits and coupling the magnitude data and sign bits.

The decoding step is performed from the most significant bits to the lowest significant bits and the restoring step is performed by coupling the decoded bit-sliced data and restoring the coupled data into quantized frequency component data.

The data is decoded in the decoding step such that bit-sliced information of four samples is decoded into units of four-dimensional vectors.

The four-dimensional vector decoding is performed such that two subvectors coded according to prestates indicating whether non-zero bit-sliced frequency components are coded or not is arithmetic-decoded, and the two subvectors decoded according to the coding states of the respective samples are restored into four-dimensional vectors.

Also, while the bit-sliced data of the respective frequency components is decoded from the MSBs, decoding is skipped if the bit-sliced data is '0' and sign data is arithmetic-decoded when the bit-sliced data '1' appears for the first time. The decoding of the scale factors is performed by decoding the maximum scale factor in the bitstream, arithmetic-decoding differences between the maximum scale factor and the respective scale factors, and subtracting the differences from the maximum scale factor. Also, the step of decoding the scale factors includes the steps of decoding the maximum scale factor from the bitstreams, obtaining differences between the maximum scale factor and scale factors to be decoded by mapping and arithmetic-decoding the differences and inversely mapping the differences from the mapped values, and obtaining the first scale factor by subtracting the differences from the maximum scale factor, and obtaining the scale factors for the remaining bands by subtracting the differences from the previous scale factors.

The decoding of the arithmetic-coded model indices is performed by the steps of decoding the minimum arithmetic model index in the bitstream, decoding differences between the minimum index and the respective indices in the side information of the respective layers, and adding the minimum index and the differences.

Alternatively, according to the present invention, there is provided a scalable stereo audio decoding apparatus for decoding audio data coded to have layered bitrates, including a bitstream analyzing portion for analyzing data necessary for the respective modules in the bitstreams having a layered structure, a decoding portion for decoding at least scale factors and arithmetic-coding model indices and quantized data, in the order of creation of the layers in bitstreams having a layered structure, the quantized data decoded alternately for the respective channels by analyzing the significance of bits composing the bitstreams, from upper significant bits to lower significant bits, a restoring portion for restoring the decoded scale factors and quantized data into signals having the original magnitudes, and a frequency/time mapping portion for converting inversely quantized signals into signals of a temporal domain.

The apparatus further includes an M/S stereo processing portion for performing M/S stereo processing for checking whether or not M/S stereo processing has been performed in the bitstream encoding method, and converting a left-channel signal and a right-channel signal into an additive signal of two signals and a subtractive signal thereof if the M/S stereo processing has been performed, a predicting portion for checking whether or not predicting step has been performed in the bitstream encoding method, and predicting frequency coefficients of the current frame if the checking step has been performed, an intensity stereo processing portion for checking whether or not intensity stereo processing has been performed in the bitstream encoding method, and, if the intensity stereo processing has been performed, then since only the quantized information of the scale factor band for one channel (the left channel) two channels is coded, performing the intensity stereo processing for restoring the quantized information of the other channel (the right channel) into a left channel value, and a temporal noise shaping portion for checking whether or not temporal noise shaping (TNS) step has been performed in the bitstream encoding method, and if the TNS step has been performed, performing temporal-noise shaping for controlling the temporal shape of the quantization noise within each window for conversion.

Further, the present invention may be written by a program executable in a computer. Also, the invention may be embodied in a general purpose digital computer that is running a program from a computer usable medium, including but not limited to storage media such as magnetic storage media (e.g., floppy disks, hard disks, etc.), optically readable media (e.g., CD-ROMs, DVDs, etc.) and carrier waves (e.g., transmissions over the Internet).

For instance, there is provided a computer usable medium, tangibly embodying a program of instructions executable by a machine to perform a scalable audio coding method for coding audio signals into a layered datastream having a base layer and enhancement layers of a predetermined number, the method including the steps of signal-processing input audio signals and quantizing the same for each predetermined coding band, and coding the quantized data corresponding to the base layer, coding the quantized data corresponding to the next enhancement layer of the coded base layer and the remaining quantized data uncoded due to a layer size limit and belonging to the coded layer, and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a predetermined same number, and then arithmetic-coded using a predetermined probability model in the order ranging from the MSB sequences to the LSB sequences, while the bit-sliced left-channel data and the right-channel data are alternately coded into units of predetermined vectors.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Hereinbelow, preferred embodiments of the present invention will be described in detail with reference to the accompanying drawings.

The present invention is to encode and decode scalable stereo digital audio data using a bit-sliced arithmetic coding (BSAC) technique. In other words, in the present invention, only a lossless coding module is replaced with the BSAC technique, with all other modules of the conventional coder remaining unchanged. The present invention extends the adoptability of the thus-constructed scalable coder/decoder, that is to say, the present invention can be adopted to a stereo signal.

Figure 1:
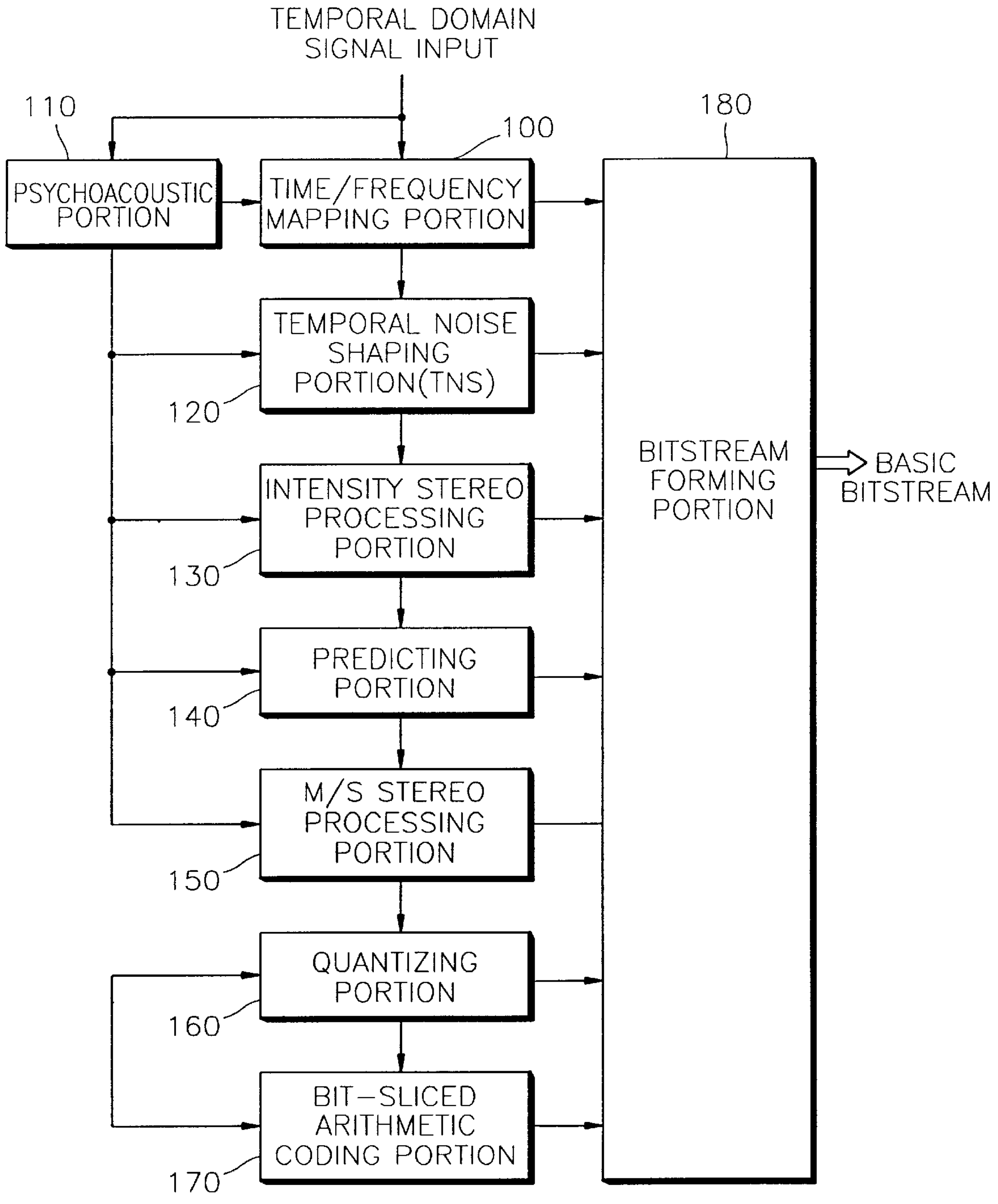
FIG. 1 is a block diagram of a coding apparatus according to the present invention.

FIG. 1 is a block diagram of a scalable audio encoding apparatus according to the present invention. The scalable audio encoding apparatus includes a time/frequency mapping portion 100, a psychoacoustic portion 110, a temporal noise shaping portion 120, an intensity stereo processing portion 130, a predicting portion 140, a mid/side (M/S)

stereo processing portion 150, a quantizing portion 160, a bit-sliced arithmetic coding portion 170, and a bitstream forming portion 180.

The most important human acoustic characteristics in coding a digital audio signal are a masking effect and a critical band feature. The masking effect refers to a phenomenon in which an audio signal (sound) is inaudible due to another signal. For example, when a train passes through a train station, a person cannot hear his/her counterpart's voice during a low-voice conversation due to the noise caused by the train. Audio signals are perceived differently for each band within the human audible frequency range. Also, in view of the critical band features, noises having the same amplitude are differently perceived when the noise signal is in a critical band or when the noise signal is out of a critical signal. In this case, when the noise signal exceeds the critical band, the noise is more clearly perceived.

Coding human acoustic characteristics basically utilizes these two characteristics such that the range of noise which can be allocated within a critical band is calculated and then quantization noise is generated corresponding to the calculated range to minimize information loss due to coding.

The time/frequency mapping portion 100 converts input audio signals of a temporal domain into audio signals of a frequency domain.

The psychoacoustic portion 110 couples the converted signals by the time/frequency mapping portion 100 by signals of predetermined scale factor bands and calculates a masking threshold at each scale factor band using a masking phenomenon generated by interaction with the respective signals.

The temporal domain noise shaping portion 120 controls the temporal shape of quantization noise within each window for conversion. The noise can be temporally shaped by filtering frequency data. This module is optionally used in the encoder.

The intensity stereo processing portion 130 is a module used for more efficiently processing a stereo signal, and encodes only the quantized information for the scale factor band of one of two channels with the scale factor band of the other channel being transmitted. This module is not necessarily used in the encoder but various matters are taken into consideration for each scale factor band to determine whether it is to be used or not.

The predicting portion 140 estimates frequency coefficients of the current frame. The difference between the predicted value and the actual frequency component is quantized and coded, thereby reducing the quantity of generated usable bits. The predicting portion 140 is optionally used in units of frames. In other words, since using the predicting portion 140 increases the complexity increases in predicting the subsequent frequency coefficient, the predicting portion 140 may not be used. Occasionally, the quantity of actually generated bits by estimation may be greater than that by non-estimation. At this time, the predicting portion 140 is not used.

The M/S stereo processing portion 150 for processing stereo signals more efficiently, converts a left-channel signal and a right-channel signal into additive and subtractive signals of two signals, respectively, to then process the same. This module is not necessarily used in the encoder but various matters are taken into consideration for each scale factor band to determine whether it is to be used or not.

The quantizing portion 160 scalar-quantizes the frequency signals of each band so that the magnitude of the quantization noise of each band is smaller than the masking threshold, so as to be imperceivable. Quantization is performed so that the NMR (Noise-to-Mask Ratio) value, which is a ratio of the masking threshold calculated by the psychoacoustic portion 210 to the noise generated at each band, is less than or equal to 0 dB. A NMR value less than or equal to 0 dB means that the masking threshold is higher than the quantization noise. In other words, the quantization noise is not audible.

The bit-sliced arithmetic coding portion 170, a core module of the present invention, can be used as an alternative to a lossless coding portion of the ACC technique since the existing audio codec such as MPEG-2 ACC cannot provide scalability. To implement the scalable audio codec, the frequency data quantized by the quantizing portion 160 is coded by combining the side information of the corresponding band and the quantization information of audio data. Also, in addition to scalability, performances similar to those in AAC can be provided in a top layer. The functions of the bit-sliced arithmetic coding portion 170 will be described in more detail. The band is limited to one corresponding to the base layer so as to be scalable, and the side information for the base layer is coded. The information for quantized values are sequentially coded in the order ranging from the MSB sequences to the LSB sequences, and from the lower frequency components to the higher frequency components. Also, left channels and right channels are alternately coded in units of predetermined vectors to perform coding of the base layer. After the coding of the base layer is completed, the side information for the next enhancement layer and the quantized values of audio data are coded so that the thus-formed bitstreams have a layered structure.

The bitstream forming portion 180 generates bitstreams according to a predetermined syntax suitable for the scalable codec by collecting information formed in the respective modules of the coding apparatus.

Figure 2:
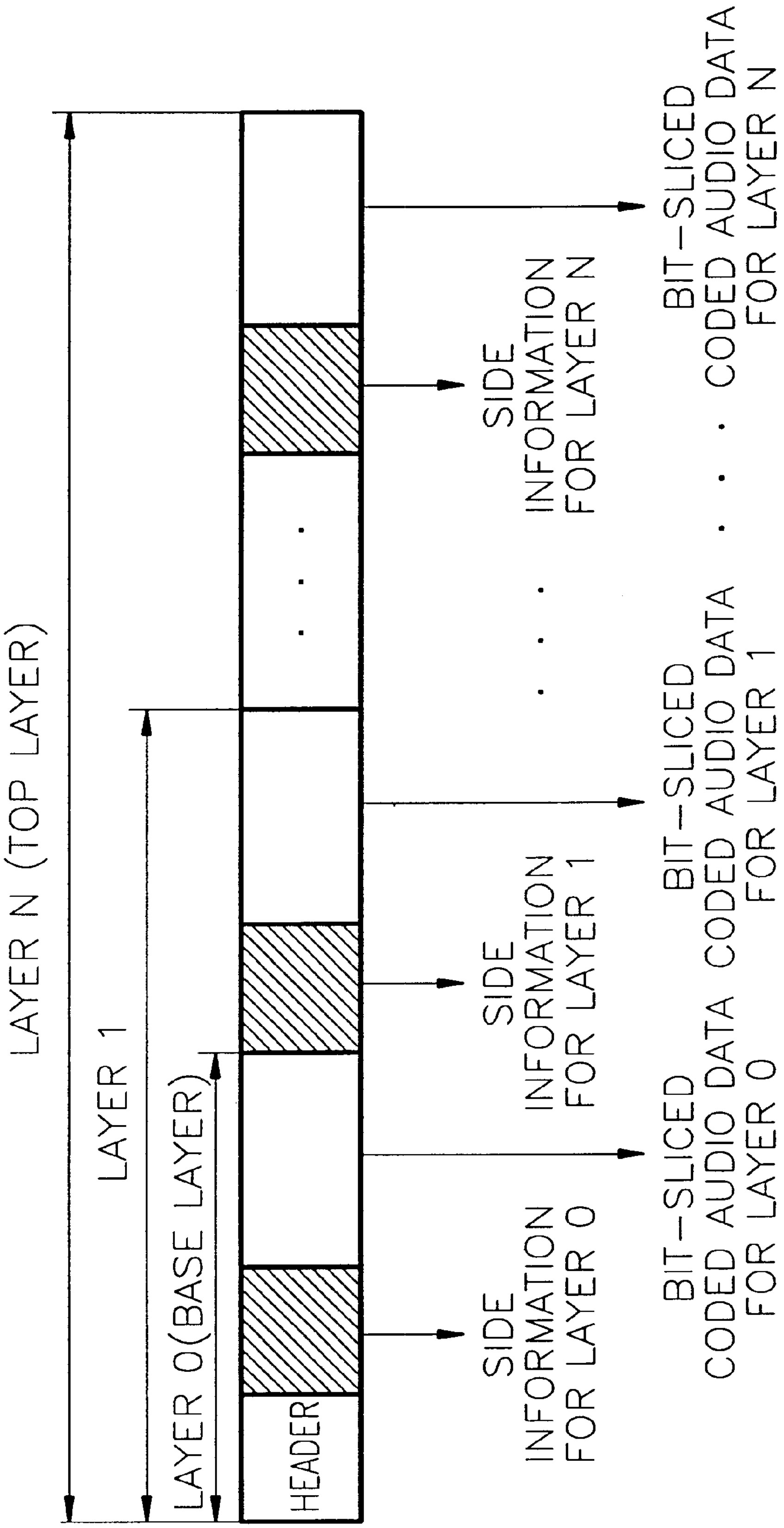
FIG. 2 shows the structure of a bitstream according to the present invention.

FIG. 2 shows the structure of a bitstream according to the present invention. As shown in FIG. 2, the bitstreams have a layered structure in which the bitstreams of lower bitrate layers are contained in those of higher bitrate layers according to bitrates. Conventionally, side information is coded first and then the remaining information is coded to form bitstreams. However, in the present invention, as shown in FIG. 2, the side information for each enhancement layer is separately coded. Also, although all quantized data are sequentially coded in units of samples conventionally, in the present invention, quantized data is represented by binary data and is coded from the MSB sequence of the binary data to form bitstreams within the allocated bits.

Figure 3:
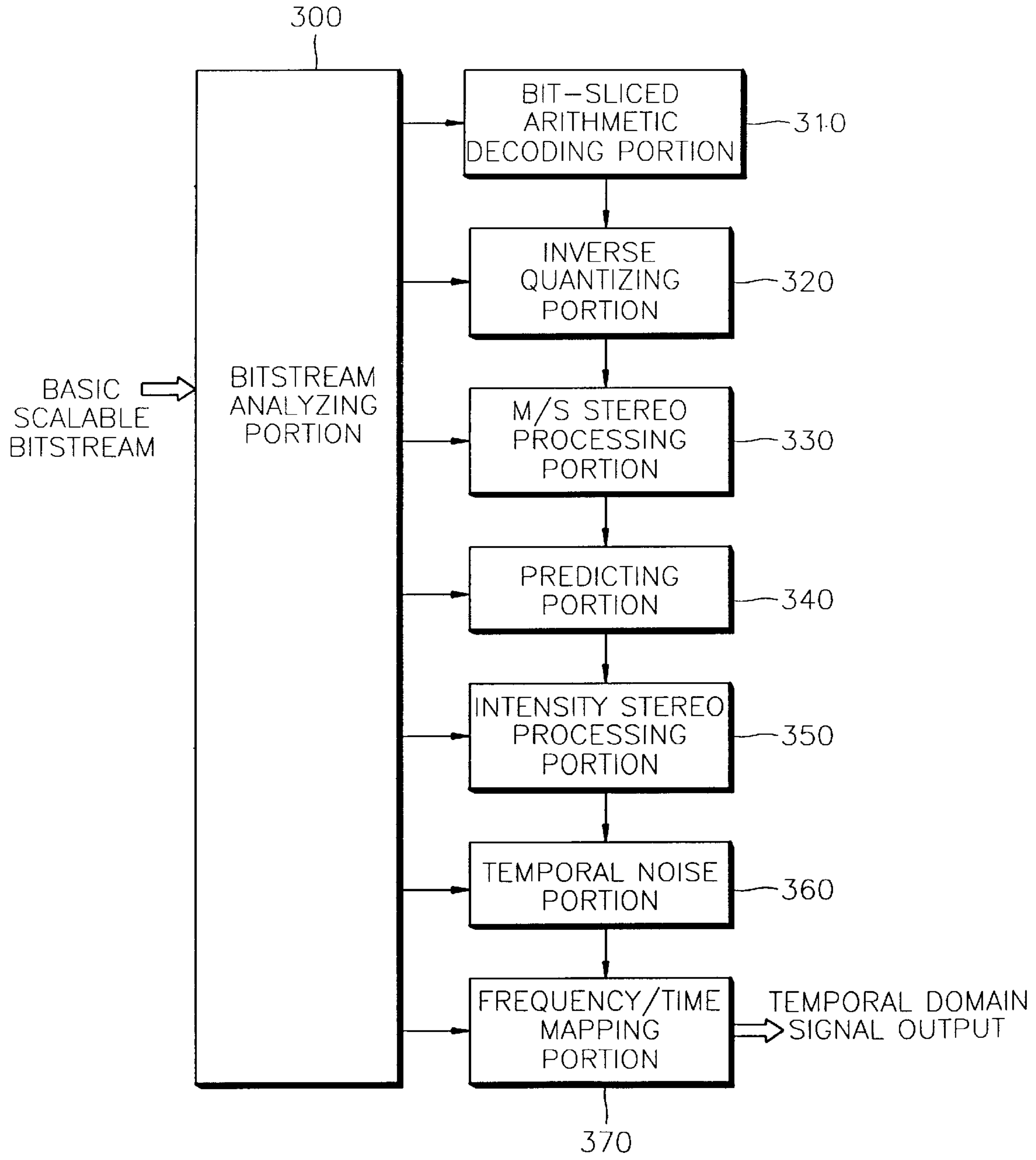
FIG. 3 is a block diagram of a decoding apparatus according to the present invention.

FIG. 3 is a block diagram of a decoding apparatus according to the present invention, which includes a bitstream analyzing portion 300, a bit-sliced arithmetic decoding portion 310, an inverse quantizing portion 320, an M/S stereo processing portion 330, a predicting portion 340, an intensity stereo processing portion 350, a temporal domain noise shaping portion 360, and a frequency/time mapping portion 370.

The bitstream analyzing portion 300 separates header information and coded data in the order of generation of the input bitstreams and transmits the same to the respective modules.

The bit-sliced arithmetic decoding portion 310 decodes side information and bit-sliced quantized data in the order of generation of the input bitstreams to be transferred to the inverse quantizing portion 320.

The M/S stereo processing portion 330 adopted only to the stereo signals processes the scale factor band corresponding to the M/S stereo processing performed in the coding apparatus.

In the case when estimation is performed in the coding apparatus, the predicting portion 340 searches the same values as the decoded data in the previous frame through estimation in the same manner as the coding apparatus. The predicted signal is added with a difference signal decoded by the bitstream analyzing portion 300, thereby restoring the original frequency components.

The intensity stereo processing portion 350 adopted only to the stereo signals processes the scale factor band corresponding to the intensity stereo processing performed in the coding apparatus.

The temporal domain noise shaping portion 360 employed for controlling the temporal shape of quantization noise within each window for conversion, performs corresponding processing.

The decoded data is restored as a signal of a temporal region by such a processing module as a conventional audio algorithm such as the AAC standards. First, the inverse quantizing portion 320 restores the decoded scale factor and quantized data into signals having the original magnitudes. The frequency/time mapping portion 370 converts inversely quantized signals into signals of a temporal domain so as to be reproduced.

Now, the operation of the coding apparatus will be described.

Input audio signals are converted to signals of a frequency domain through MDCT (Modified Discrete Cosine Transform) in the time/frequency mapping portion 100. The psychoacoustic portion 110 couples the frequency signals by appropriate scale factor bands to obtain a masking threshold. Also, the audio signals converted into signals of a frequency domain pass through modules for enhancing the coding efficiency, that is, the TNS portion 120, the intensity stereo processing portion 130, the predicting portion 140 and the M/S stereo processing portion 150, to then become more efficiently compressed signals.

The quantizing portion 160 performs scalar quantization so that the magnitude of the quantization noise of each scale factor band is smaller than the masking threshold, which is audible but is not perceivable within allocated bits. If quantization fulfilling such conditions is performed, scale factors for the respective scale factor bands and quantized frequency values are generated.

Generally, in view of human psychoacoustics, close frequency components can be easily perceived at a lower frequency. However, as the frequency increases, the interval of perceivable frequencies becomes wider. The bandwidths of the scale factor bands increase as the frequency bands become higher. However, to facilitate coding, the scale factor bands of which the bandwidth is not constant are not used for coding, but coding bands of which the bandwidth is constant are used instead. The coding bands include 32 quantized frequency coefficient values.

The conventional coding/decoding apparatus, in which only the coding efficiency is taken into consideration, such as AAC, first codes the information commonly used in left and right channels at a place of the header, in processing stereo signals. The left-channel data is coded and the right-channel data is then coded. That is, coding is progressed in the order of header, left channel and right channel.

When the information for the left and right channels are arranged and transmitted irrespective of significance after the header is processed in such a manner, if the bitrate is lowered, signals for the right channel positioned backward disappear first. Thus, the perceivable lowering in the performance becomes serious.

However, the stereo audio coding apparatus according to the present invention codes side information for each channel. In other words, the side information for each channel is coded by the bit-sliced arithmetic coding portion 170 alternately in the order of the left channel and the right channel. The coding method of scale factors is slightly modified for more efficient compression.

First, coding of scale factors will be described. The stereo audio coding apparatus according to the present invention codes scale factors using two methods to be described below for the purpose of enhancing the coding efficiency. The coding apparatus selects a method exhibiting better performance and transmits the selected method to the decoding apparatus.

To compress scale factors, first, the maximum scale factor (max_scalefactor) is obtained from the scale factors. Then, differences between the respective scale factors and the maximum scale factor are obtained and then the differences are arithmetic-coded. Four models are used in arithmetic-coding the differences between scale factors. The four models are demonstrated in Tables 5.5 through 5.8. The information for the models is stored in a scalefactor_model.

TABLE 5.5

Differential scale factor arithmetic model 1

| Size | Cumulative frequencies |
|---|---|
| 8 | 1342, 790, 510, 344, 214, 127, 57, 0 |

TABLE 5.6

Differential scale factor arithmetic model 2

| Size | Cumulative frequencies |
|---|---|
| 16 | 2441, 2094, 1798, 1563, 1347, 1154, 956, 818, 634, 464, 342, 241, 157, 97, 55, 0 |

TABLE 5.7

Differential scale factor arithmetic model 3

| Size | Cumulative frequencies |
|---|---|
| 32 | 3963, 3525, 3188, 2949, 2705, 2502, 2286, 2085, 1868, 1668, 1515, 1354, 1207, 1055, 930, 821, 651, 510, 373, 269, 192, 134, 90, 58, 37, 29, 24, 15, 10, 8, 5, 0 |

TABLE 5.8

Differential scale factor arithmetic model 4

| Size | Cumulative frequencies |
|---|---|
| 64 | 13587, 13282, 12961, 12656, 12165, 11721, 11250, 10582, 10042, 9587, 8742, 8010, 7256, 6619, 6042, 5480, 4898, 4331, 3817, 3374, 3058, 2759, 2545, 2363, 2192, 1989, 1812, 1582, 1390, 1165, 1037, 935, 668, 518, 438, 358, 245, 197, 181, 149, 144, 128, 122, 117, 112, 106, 101, 85, 80, 74, 69, 64, 58, 53, 48, 42, 37, 32, 26, 21, 16, 10, 5, 0 |

Second, to compress scale factors, the maximum scale factor (max_scalefactor) is obtained from the scale factors, as in the first method. Then, the difference between the first scale factors and the maximum scale factor is obtained and then the difference is arithmetic-coded. Then, differences between the remaining scale factors and the previous scale factors are obtained and the differences are arithmetic-coded. In this case, since the used models are prescribed, the scalefactor_model value is meaningless.

Next, coding of quantized frequency components for a stereo signal will be described. Quantized data for each channel is bit-sliced. When a mono-channel signal is processed, bit-sliced data is coupled by four-dimensional vectors and the four-dimensional vectors are used as a basic unit. This is also true of the coding of a stereo-channel signal. In other words, coding is started from the MSB. The four-dimensional vectors of the bit-sliced data are arithmetic-coded from the left channel. Next, the four-dimensional vectors for the right channel at the same frequency level are arithmetic-coded. In such a manner, the left channel and the right channel are interleaved to be coded.

In the case of a single channel, coding is performed from the MSB to the LSB. The bit-sliced data having the same sinificance are coded from lower frequency components to higher frequency components. At this time, if the bits allocated to the respective vectors are more significant than those currently being coded, it is not necessary to code the pertinent vector and the coding of the same is skipped.

XQ0, XQ1, XQ2, . . . , XQk, . . .

where Xqk is bit-sliced data of the quantized frequency components from 4*k to 4*k+3.

In the case of two channels, coding is performed from the MSB to the LSB, as in the case of a single channel. Similarly, the bit-sliced data having the same significance are coded from lower frequency components to higher frequency components. However, considering that there are two channels, the coding sequence is decided. It is assumed that the quantized frequency components in the left- and right-channels are as follows:

Left-channel: XQL0, XQL1, XQL2, XQL3, XQL4, XQL5, . . . , XQLk, . . .

Right-channel: XQR0, XQR1, XQR2, XQL3, XQL4, XQL5, . . . , XQRk, . . .

where XQLk and XQLRk are bit-sliced data of the quantized frequency components from 4*k to (4*k+3).

In this way, in the case of two channels, the coding is performed from the lower frequency components to higher frequency components in a similar sequence to the case of one channel. However, interleaving is performed between channel components in order to code significant components first. In other words, the respective vectors are alternately coded between two channels as follows:

XQL1, XQR1, XQL2, XQR2, . . .

Since the thus-formed information is sequentially coded in the order of significance in both channels, even though the bitrate is reduced in a scalable audio codec, the performance is not considerably lowered.

Now, a preferred embodiment of the present invention will be described. The present invention is adoptable to the base structure of the AAC standards including all modules such as additional modules for enhancing the coding efficiency and implements a scalable digital audio data coder. In other words, in the present invention, while the basic modules used in AAC standard coding/decoding are used, only the lossless coding module is replaced with the bit-sliced encoding method to provide a scalable coding apparatus. In the present invention, information for only one bitrate is not coded within one bitstream but information for the bitrates of various enhancement layers is coded within a bitstream, with a layered structure, as shown in FIG. 2, in the order ranging from more important signal components to less important signal components.

According to the embodiment of the present invention, the same modules as the AAC standards are employed until before the lossless coding of the BSAC scalable codec. Thus, if the quantized frequency data is formed by decoding the AAC bitstreams, the decoded data can be restored to the BSAC scalable bitstreams. This means that lossless transcoding is possible between the AAC bitstreams and the BSAC scalable bitstreams. Finally, mutual conversion into an appropriate bitstream format is allowed depending upon environments or circumstances. Thus, both coding efficiency and scalability can be satisfied and are complementary to each other, which is distinguished from another scalable codec.

Using the thus-formed bitstreams, bitstreams having a low bitrate can be formed by simply rearranging the low bitrate bitstreams contained in the highest bitstream, by user request or according to the state of transmission channels. In other words, bitstreams formed by a coding apparatus on a real time basis, or bitstreams stored in a medium, can be rearranged to be suitable for a desired bitrate by user request, to then be transmitted. Also, if the user's hardware performance is poor or the user wants to reduce the complexity of the decoder, even with appropriate bitstreams, only some bitstreams can be restored, thereby controlling the complexity.

For example, in forming a scalable bitstream, the bitrate of a base layer is 16 Kbps, that of a top layer is 64 Kbps, and the respective enhancement layers has a bitrate interval of 8 Kbps, that is, the bitstream has 7 layers of 16, 24, 32, 40, 48, 56 and 64 Kbps. The respective enhancement layers are defined as demonstrated in Table 2.1. Since the bitstream formed by the coding apparatus has a layered structure, as shown in FIG. 3, the bitstream of the top layer of 64 Kbps contains the bitstreams of the respective enhancement layers (16, 24, 32, 40, 48, 56 and 64 Kbps). If a user requests data for the top layer, the bitstream for the top layer is transmitted without any processing therefor. Also, if another user requests data for the base layer (corresponding to 16 Kbps), only the leading bitstreams are simply transmitted.

TABLE 2.1

| Bitrate for each layer (8 kbps interval) | |
|---|---|
| Layer | Bitrate (kbps) |
| 0 | 16 |
| 1 | 24 |
| 2 | 32 |
| 3 | 40 |
| 4 | 48 |
| 5 | 56 |
| 6 | 64 |

Alternatively, the enhancement layers may be constructed in finer intervals. The bitrate of a base layer is 16 Kbps, that of a top layer is 64 Kbps, and each enhancement layer has a bitrate interval of 1 Kbps. The respective enhancement layers are constructed as demonstrated in Table 3.1. Therefore, fine granule scalability can be implemented, that is, scalable bitstreams are formed in a bitrate interval of 1 kbps from 16 kbps to 64 kbps.

TABLE 3.1

| Bitrate for each layer (1-kbps interval) | |
|---|---|
| Layer | Bitrate |
| 0 | 16 |
| 1 | 17 |
| 2 | 18 |
| 3 | 19 |
| 4 | 20 |
| 5 | 21 |
| 6 | 22 |
| 7 | 23 |
| 8 | 24 |
| 9 | 25 |
| 10 | 26 |
| 11 | 27 |
| 12 | 28 |
| 13 | 29 |
| 14 | 30 |
| 15 | 31 |
| 16 | 32 |
| 17 | 33 |
| 18 | 34 |
| 19 | 35 |
| 20 | 36 |
| 21 | 37 |
| 22 | 38 |
| 23 | 39 |
| 24 | 40 |
| 25 | 41 |
| 26 | 42 |
| 27 | 43 |
| 28 | 44 |
| 29 | 45 |
| 30 | 46 |
| 31 | 47 |
| 32 | 48 |
| 33 | 49 |
| 34 | 50 |
| 35 | 51 |
| 36 | 52 |
| 37 | 53 |
| 38 | 54 |
| 39 | 55 |
| 40 | 56 |
| 41 | 57 |
| 42 | 58 |
| 43 | 59 |
| 44 | 60 |
| 45 | 61 |
| 46 | 62 |
| 47 | 63 |
| 48 | 64 |

The respective layers have limited bandwidths according to bitrates. If 8 kbps interval scalability is intended, the bandwidths are limited, as demonstrated in Tables 2.2 and 2.3. In the case of a 1-kbps interval, the bandwidths are limited, as demonstrated in Tables 3.2 and 3.3.

TABLE 2.2

| Band limit in each layer for short windows (8-kbps interval) | |
|---|---|
| Layer | Band limit |
| 0 | 20 |
| 1 | 28 |
| 2 | 40 |
| 3 | 52 |
| 4 | 60 |
| 5 | 72 |
| 6 | 84 |

TABLE 2.3

| Band limit in each layer for long windows (8-kbps interval) | |
|---|---|
| Layer | Band limit |
| 0 | 160 |
| 1 | 244 |
| 2 | 328 |
| 3 | 416 |
| 4 | 500 |
| 5 | 584 |
| 6 | 672 |

TABLE 3.2

| Band limit in each layer for short windows (1-kbps interval) | |
|---|---|
| Layer | Band limit |
| 0 | 20 |
| 1 | 20 |
| 2 | 20 |
| 3 | 24 |
| 4 | 24 |
| 5 | 24 |
| 6 | 28 |
| 7 | 28 |
| 8 | 28 |
| 9 | 32 |
| 10 | 32 |
| 11 | 32 |
| 12 | 36 |
| 13 | 36 |
| 14 | 36 |
| 15 | 40 |
| 16 | 40 |
| 17 | 40 |
| 18 | 44 |
| 19 | 44 |
| 20 | 44 |
| 21 | 48 |
| 22 | 48 |
| 23 | 48 |
| 24 | 52 |
| 25 | 52 |
| 26 | 52 |
| 27 | 56 |
| 28 | 56 |
| 29 | 56 |
| 30 | 60 |
| 31 | 60 |
| 32 | 60 |
| 33 | 64 |
| 34 | 64 |
| 35 | 64 |
| 36 | 68 |
| 37 | 68 |
| 38 | 68 |
| 39 | 72 |
| 40 | 72 |
| 41 | 72 |
| 42 | 76 |
| 43 | 76 |
| 44 | 76 |
| 45 | 80 |
| 46 | 80 |
| 47 | 80 |
| 48 | 84 |

TABLE 3.3

| Band limit in each layer for long windows (1-kbps interval) | |
|---|---|
| Layer | Band limit |
| 0 | 160 |
| 1 | 168 |
| 2 | 180 |
| 3 | 192 |
| 4 | 200 |
| 5 | 212 |
| 6 | 224 |
| 7 | 232 |
| 8 | 244 |
| 9 | 256 |
| 10 | 264 |
| 11 | 276 |
| 12 | 288 |
| 13 | 296 |
| 14 | 308 |
| 15 | 320 |
| 16 | 328 |
| 17 | 340 |
| 18 | 352 |
| 19 | 360 |
| 20 | 372 |
| 21 | 384 |
| 22 | 392 |
| 23 | 404 |
| 24 | 416 |
| 25 | 424 |
| 26 | 436 |
| 27 | 448 |
| 28 | 456 |
| 29 | 468 |
| 30 | 480 |
| 31 | 488 |
| 32 | 500 |
| 33 | 512 |
| 34 | 520 |
| 35 | 532 |
| 36 | 544 |
| 37 | 552 |
| 38 | 564 |
| 39 | 576 |
| 40 | 584 |
| 41 | 596 |
| 42 | 608 |
| 43 | 616 |
| 44 | 628 |
| 45 | 640 |
| 46 | 648 |
| 47 | 660 |
| 48 | 672 |

Input data is a PCM data sampled at 48 KHz, and the magnitude of one frame is 1024. The number of bits usable for one frame for a bitrate of 64 Kbps is 1365.3333 (=64000 bits/sec*(1024/48000)) on the average. Similarly, the size of available bits for one frame can be calculated according to the respective bitrates. The calculated numbers of available bits for one frame are demonstrated in Table 2.4 in the case of 8 kbp.

TABLE 2.4

| Available bits for each channel in each layer (8-kbps interval) | |
|---|---|
| Layer | Available bits |
| 0 | 341 |
| 1 | 512 |
| 2 | 682 |
| 3 | 853 |
| 4 | 1024 |

TABLE 2.4-continued

| Available bits for each channel in each layer (8-kbps interval) | |
|---|---|
| Layer | Available bits |
| 5 | 1194 |
| 6 | 1365 |

Now, the stereo audio signal coding and decoding procedure according to the present invention will now be described in detail.

1. Coding procedure

The entire coding procedure is the same as that described in MPEG-2 ACC International standards, and the bit-sliced coding proposed in the present invention is adopted as lossless coding.

1.1. Psychoacoustic portion

Using a psychoacoustic model, the block type of a frame being currently processed (long, start, short, or stop), the SMR values of the respective processing bands, group information of a short block and temporally delayed PCM data for time/frequency synchronization with the psychoacoustic model, are first generated from input data, and transmitted to a time/frequency mapping portion. ISO/IEC 11172-3 Model 2 is employed for calculating the psychoacoustic model [MPEG Committee ISO/IEC/JTC1/SC29/WG11, Information technology-Coding of moving pictures and associated audio for data storage media to about 1.5 Mbit/s-Part 3: Audio, ISO/OEC IS 11172-3, 1993]. This module must be necessarily used but different models may be used according to users.

1.2. Time/frequency mapping portion

A time/frequency mapping defined in the MPEG-2 AAC International standards is used. The time/frequency mapping portion converts data of a temporal domain into data of a frequency domain using MDCT according to the block type output using the psychoacoustic model. At this time, the block sizes are 2048 and 256 in the case of long/start/stop blocks and in the case of a short block, respectively, and MDCT is performed 8 times. Then, the window type and window grouping information are transmitted to the bitstream forming portion 180. The same procedure as that used in the conventional MPEG-2 AAC [MPEG Committee ISO/IEC/JTC1/SC29/WG11, ISO/IEC MPEG-2 AAC IS 13818-7, 1997] has been used heretofore.

1.3. Temporal noise shaping portion (TNS)

A temporal noise shaping portion defined in the MPEG-2 AAC International standards is used. The TNS 120 is an optional module and controls the temporal shape of the quantization noise within each window for conversion. The temporal noise shaping can be performed by filtering frequency data. The TNS 120 transmits the TNS information to the bitstream forming portion 180.

1.4. Intensity stereo processing portion

An intensity stereo processing portion defined in the MPEG-2 AAC International standards is used. The intensity stereo processing portion 130 is one method for processing stereo signals more efficiently. The intensity stereo processing is performed such that only the quantized information of a scale factor band for one of two channels is coded, and only the scale factor for the other channel is transmitted. This module is an optional module and it is determined whether this module is to be used or not for each scale factor band considering various conditions. The intensity stereo processing module 130 transmits intensity stereo flag values to the bitstream forming portion 180.

1.5. Predicting portion

A predicting portion defined in the MPEG-2 AAC International standards is used. The predicting portion 140 is an optional module and predicts frequency coefficients of the present frame. Also, the predicting portion 140 transmits the parameters relating to prediction to the bitstream forming portion 180.

1.6. Mid/Side (M/S) stereo processing portion

An M/S stereo processing portion defined in the MPEG-2 AAC International standards is used. The M/S stereo processing portion 150 is an optional module and is one of methods for processing stereo signals more efficiently. M/S stereo processing is performed for converting a left-channel signal and a right-channel signal into an additive signal of two signals and a subtractive signal thereof.

1.7. Quantizing portion

The data converted into that of a frequency domain is quantized with increasing scale factors so that the SNR value of the scale factor band shown in Tables 1.1 and 1.2 is smaller than the SMR as the output value of the psychoacoustic model. Here, scalar quantization is performed, and the basic scale factor interval is $2^{1/4}$. Quantization is performed so that the perceivable noise is minimized. The exact quantization procedure is described in the MPEG-2 AAC. Here, the obtained output is quantized data and scale factors for the respective scale factor bands.

TABLE 1.1

Scale factor band for long blocks

| swb | swb_offset_long window |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |
| 11 | 48 |
| 12 | 56 |
| 13 | 64 |
| 14 | 72 |
| 15 | 80 |
| 16 | 88 |
| 17 | 96 |
| 18 | 108 |
| 19 | 120 |
| 20 | 132 |
| 21 | 144 |
| 22 | 160 |
| 23 | 176 |
| 24 | 196 |
| 25 | 216 |
| 26 | 240 |
| 27 | 264 |
| 28 | 292 |
| 29 | 320 |
| 30 | 352 |
| 31 | 384 |
| 32 | 416 |
| 33 | 448 |
| 34 | 480 |
| 35 | 512 |
| 36 | 544 |
| 37 | 576 |
| 38 | 608 |
| 39 | 640 |
| 40 | 672 |
| 41 | 704 |

TABLE 1.1-continued

Scale factor band for long blocks

| swb | swb_offset_long window |
|---|---|
| 42 | 736 |
| 43 | 768 |
| 44 | 800 |
| 45 | 832 |
| 46 | 864 |
| 47 | 896 |
| 48 | 928 |
| | 1024 |

TABLE 1.2

Scale factor band for short blocks

| swb | swb_offset_short window |
|---|---|
| 0 | 0 |
| 1 | 4 |
| 2 | 8 |
| 3 | 12 |
| 4 | 16 |
| 5 | 20 |
| 6 | 28 |
| 7 | 36 |
| 8 | 44 |
| 9 | 56 |
| 10 | 68 |
| 11 | 80 |
| 12 | 96 |
| 13 | 112 |
| | 128 |

1.8. Bit packing using Bit-sliced arithmetic coding

Figure 4:
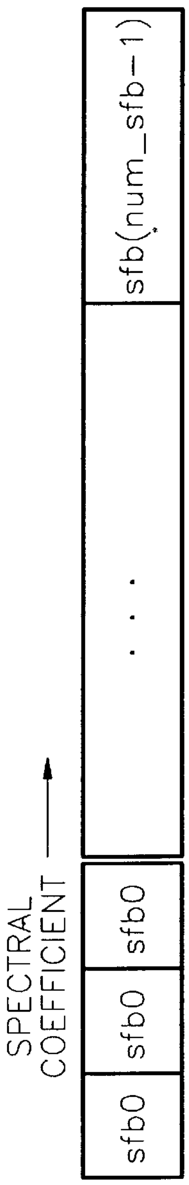
FIG. 4 illustrates the arrangement of frequency components for a long block (window size=2048)
Figure 5:
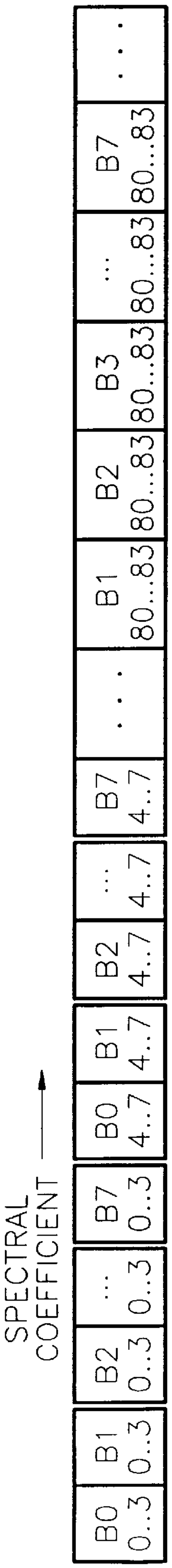
FIG. 5 illustrates the arrangment of frequency components for a short block (window size=2048).

Bit packing is performed by the bit-sliced arithmetic coding portion 170 and the bitstream forming portion 180. For convenient coding, frequency components are rearranged. The rearrangement order is different depending on block types. In the case of using a long window in the block type, the frequency components are arranged in the order of scale factor bands, as shown in FIG. 4. In the case of using a short window in the block type, each four frequency components from eight blocks are repeatedly arranged in increasing order, as shown in FIG. 5.

The rearranged quantized data and scale factors are formed as layered bitstreams. The bitstreams are formed by syntaxes demonstrated in Tables 7.1 through 7.13. The leading elements of a bitstream are elements which can be commonly used in the conventional AAC, and the elements newly proposed in the present invention are specifically explained. However, the principal structure is similar to that of the AAC standards.

TABLE 7.1

Syntax of bsac_1step_data_block ()

| Syntax | No. of bits | Mnemonics |
|---|---|---|
| bsac_lstep_data_block()<br>{<br>  lslayer=0;<br>  while(data_available() ) {<br>    bsac_lstep_stream(lslayer)<br>  lslayer++;<br>  }<br>} | | |

TABLE 7.2

Syntax of bsac__lstep__stream ()

| Syntax | No. of bits | Mnemonics |
|---|---|---|
| bsac__lstep__stream(lslayer) | | |
| { | | |
| for(i=lstep__offset[lslayer];i<lstep__offset[lslayer+1];i++) | | |
| BSAC__stream__buf[i] | 8 | unimsbf |
| /* Large step stream is saved in BSAC__stream__buf[]. | | |
| BSAC__stream__buf[] is mapped to small step stream, | | |
| bsac__raw__data__block(), for the actual decoding. | | |
| see the decoding process of BSAC large step scalability | | |
| for more detailed description. | | |
| /* | | |
| } | | |

TABLE 7.3

Syntax of bsac__raw__data__block ()

| Syntax | No. of bits | Mnemonics |
|---|---|---|
| bsac__raw__data__block() | | |
| { | | |
| bsac__main__stream() | | |
| layer=1; | | |
| while(data__available() layer<=encoded__layer) { | | |
| bsac__layer__stream(nch, layer) | | |
| layer++; | | |
| } | | |
| byte__alignment() | | |
| } | | |

TABLE 7.4

Syntax of bsac__main__stream ()

| Syntax | No. of bits | Mnemonics |
|---|---|---|
| bsac__main__stream() | | |
| { | | |
| nch | 3 | unimsbf |
| switch(nch) { | | |
| case 1 : bsac__single__main__stream() | | |
| break | | |
| case 2 : bsac__pair__main__stream() | | |
| break | | |
| } | | |
| } | | |

TABLE 7.5

Syntax of bsac__single__main__stream ()

| Syntax | No. of bits | Mnemonics |
|---|---|---|
| bsac__single__main__stream() | | |
| { | | |
| itp__data__present | 1 | unimsbf |
| if (ltp__dat__present) | | |
| ltp__data() | | |
| bsac__channel__stream(1, 1) | | |
| } | | |

TABLE 7.6

Syntax of bsac__pair__main__stream ()

| Syntax | No. of bits | Mnemonics |
|---|---|---|
| bsac__pair__main__stream() | | |
| { | | |
| ltp__data__present | 1 | uimsbf |
| if (ltp__data__present) { | | |
| ltp__data() | | |
| ltp__data() | | |
| } | | |
| common__window | 1 | uimsbf |

TABLE 7.6-continued

Syntax of bsac__pair__main__stream ()

| Syntax | No. of bits | Mnemonics |
|---|---|---|
| if(common__window) | | |
| stereo__mode | 2 | uimbf |
| bsac__channel__stream(2, common__window) | | |
| } | | |

TABLE 7.7

Syntax of bsac__layer__stream ()

| Syntax | No. of bits | Mnemonics |
|---|---|---|
| bsac__layer__stream(nch, layer) } | | |
| { | | |
| bsac__side__info(nch, layer) | | |
| bsac__spectral__data(nch, layer) | | |
| } | | |

TABLE 7.8

Syntax of bsac__channel__stream ()

| Syntax | No. of bits | Mnemonics |
|---|---|---|
| bsac__channel__stream(nch, common__window) | | |
| { | | |
| for(ch=0;ch<nch;ch++) | | |
| max__scalefactor[ch] | 8 | uimbf |
| ics__info() | | |
| if(!common__window) | | |
| ics__info() | | |
| for(ch=0;ch<nch;ch++) { | | |
| tns__data__present[ch] | 1 | uimbf |
| if(tns__data__present[ch]) | | |
| tns__data() | | |
| gain__control__data__present[ch] | 1 | uimbf |
| if(gain__control__data__present[ch]) | | |
| gain__control__data() | | |
| } | | |
| PNS__data__present | 1 | uimbf |
| if (PNS__data__present) | | |
| PNS__start__sfb | 6 | uimbf |
| bsac__general__info(nch) | | |
| bsac__layer__stream(nch, 0) | | |
| } | | |

TABLE 7.9

Syntax of bsac__general__info ()

| Syntax | No. of bits | Mnemonics |
|---|---|---|
| bsac__general__info(nch) | | |
| { | | |
| frame__length | 10/11 | uimbf |
| encoded__layer | 6 | uimbf |
| for(ch=0;ch<nch;ch++) { | | |
| scalefactor__model[ch] | 2 | uimbf |
| min__ArModel[ch] | 5 | uimbf |
| ArModel__model[ch] | 2 | uimbf |
| scf__coding[ch] | 1 | uimbf |
| } | | |
| } | | |

TABLE 7.10

Syntax of bsac__side__info ()

| Syntax | No. of bits | Mnemonics |
|---|---|---|
| bsac__side__info (nch, layer) | | |
| { | | |
| if(nch == 1 && PNS__data__present) { | | |
| for (sfb=PNS__start__sfb; sfb<max__sfb; sfb++) | | |
| acode__noise__flag[g][sfb] | 0..1 | bslbf |
| } | | |
| else if (stereo__mode > 1 ¦¦ PNS__data__present) | | |
| for(g = 0; g < num__window__group; g++) | | |
| for(sfb=layer__sfb[layer]; sfb<layer__sfb[layer+1]; sfb++) | | |
| { | | |
| if (stereo__mode == 2) | | |
| acode__ms__used[g][sfb] | | |
| else if (stereo__mode==3) | 0..1 | bslbf |
| acode__stereo__info[g][sfb] | | |
| } | 0..3 | bslbf |
| if (PNS__data__present && sfb>=PNS__start__sfb) { | | |
| if (stereo__info==0 ¦¦ stereo__info==3) { | | |
| acode__noise__flag__l[g][sfb] | | |
| acode__noise__flag__r[g][sfb] | 0..1 | bslbf |
| } | 0..1 | bslbf |
| if (stereo__info==3) { | | |
| if (noise__flag__l[g][sfb] && noise__flag__r[g][sfb]) | | |
| acode__noise__mode[g][sfb] | | |
| } | 0..2 | bslbf |
| } | | |

TABLE 7.10-continued

Syntax of bsac_side_info ()

| Syntax | No. of bits | Mnemonics |
|---|---|---|
| } | | |
| } | | |
| for(ch=0;ch<nch;ch++) | | |
| for(g = 0; g < num_window_group; g++) | | |
| for(sfb=layer_sfb[layer]; sfb<layer_sfb[layer+1]; sfb++) | | |
| acode_scf[ch][g][sfb] | | |
| | 0..13 | bslbf |
| for(ch=0;ch<nch;ch++) | | |
| for(sfb=layer_sfb[layer]; sfb<layer_sfb[layer+1]; sfb++) | | |
| for(g = 0; g < num_window_group; g++) { | | |
| band = (sfb * num_window_group ) + g | | |
| for(i=swb_offset[band]; i<swb_offset[band+1]; i+=4) | | |
| cband = index2cb(ch, l); | | |
| if(!decode_cband[ch][cband]) { | | |
| acode_ArModel[ch][cband] | | |
| decode_cband[ch][cband] = 1; | 0..13 | bslbf |
| } | | |
| } | | |
| } | | |
| } | | |

TABLE 7.11

Syntax of bsac_spectral_data ()

| Syntax | No. of bits | Mnemonics |
|---|---|---|
| bsac_spectral_data(nch, layer) | | |
| { | | |
| for (snf=maxsnf; snf>0; snf--) { | | |
| for (i =0; i <last_index; i +=4) { | | |
| for(ch=0;ch<nch;ch++) { | | |
| if(i >= layer_index[ch]) continue; | | |
| if (cur_snf[ch][i]<snf) continue; | | |
| dim0 = dim1 = 0 | | |
| for(k = 0; k < 4; k++) | | |
| if(prestate[ch][i +k]) dim1++ | | |
| else dim0++ | | |
| if(dim0) | | |
| acode_vec0 | 0.14 | bs1bf |
| if(dim1) | | |
| acode_vec1 | 0.14 | bs1bf |
| for(k = 0; k < 4; k++) | | |
| if(sample[ch][i +k] &&!prestate[ch][i +k]) { | | |
| acode_sign | 1 | bs1bf |
| prestate[ch][i +k] = 1 | | |
| } | | |
| } | | |
| cur_snf[ch][i]-- | | |
| if(total_estimated_bits>= available_bits [layer]) return | | |
| } | | |
| } | | |
| if (total_estimated_bits >= available_bits[layer]) return | | |
| } | | |
| } | | |

The elements newly proposed in the present invention will be specifically explained.

1.8.1. Coding of bsac_channel_stream 'common_window' represents whether two channels use the same format block, 'ax_scalefactor[ch]' represents the maximum value of the scale factors, which is an integer, e.g., 8 bits. Also, 'tns_data_resent[ch]' represents whether TNS is employed in the coding apparatus or not. 'gain_control_data_present[ch]' represents a flag indicating that the time/frequency mapping method is used for supporting scalable sampling rate (SSR) in AAC. Also, 'stereo_mode' represents a 2-bit flag indicating a stereo signal processing method, in which '00' means independent, '01' means All ms_used are ones, '10' means 1 bit mask of max_sfb bands of ms_used is located in the layer side information part, '11' means 2 bit mask of max_sfb bands of stereo_info is located in the layer side information part.

1.8.2. Coding of bsac_data

'frame_length' represents the size of all bitstreams for one frame, which is expressed in units of bytes, e.g., 9 bits in the case of a mono signal (MS), and 10 bits in the case of a stereo signal. Also, 'encoded_layer' represents the coding for the top layer coded in the bitstream, which is 3 bits in the case of a 8-kbps interval and 6 bits in the case of a 1-kbps interval, respectively. The information for the enhancement layers is demonstrated in Tables 2.1 and 3.1. Also, 'scalefactor_model [ch]' represents information concerning models to be used in arithmetic-coding differences in scale factors. These models are shown in Table 4.2.

TABLE 4.2

Arithmetic Model of differential scale factor

| Model number | Largest differential scale factor | Model listed table |
|---|---|---|
| 0 | 7 | Table 5.5 |
| 1 | 15 | Table 5.6 |
| 2 | 31 | Table 5.7 |
| 3 | 63 | Table 5.8 |

'min_ArModel' represents the minimum value of the arithmetic coding model indices. 'ArModel_model' represents information concerning models used in arithmetic-coding the difference signal between the ArModel and min_ArModel. This information is shown in Table 4.3.

TABLE 4.3

Arithmetic Model of differential ArModel

| Model number | Largest differential scale factor | |
|---|---|---|
| 0 | 3 | Table 5.9 |
| 1 | 7 | Table 5.10 |
| 2 | 15 | Table 5.11 |
| 3 | 31 | Table 5.12 |

1.8.3. Coding bsac_side_info

The information which can be used for all layers is first coded and then the side information commonly used for the respective enhancement layers is coded. 'acode_ms_used [g][sfb]' represents a codeword obtained by arithmetic-coding ms_used, i.e., a 1-bit flag indicating whether or not M/S coding is performed in the window group g and scale factor band scf, in which ms_used is defined as follows:

0: Independent

1: ms_used.

'acode_ms_used [g][sfb]' represents a codeword obtained by arithmetic-coding ms_used, i.e., a 1-bit flag indicating whether or not M/S coding is employed in the window group g and scale factor band scf, in which ms_used is defined as follows:

0: Independent; and

1: ms_used.

'acode_stereo_info [g][sfb]' represents a codeword obtained by arithmetic-coding ms_used, i.e., a 2-bit flag indicating whether or not intensity stereo coding is employed in the window group g and scale factor band scf, in which stereo_info is defined as follows:

00: Independent;

01: ms_used;

10: Intensity_in_phase; and

11: Intensity_out_of_phase.

'Acode_scf' represents a codeword obtained by arithmetic-coding the scale factor, and 'acode_ArModel' represents a codeword obtained by arithmetic-coding the ArModel. The ArModel is information on which is selected from the models listed in Table 4.3.

1.8.4. Coding of bsac_spectral_data

The side information commonly used for the respective enhancement layers, the quantized frequency components are bit-sliced using the BSAC technique and then arithmetic-coded. 'acode_vec0' represents a codeword obtained by arithmetic-coding the first subvector (subvector 0) using the arithmetic model defined as the ArModel value. 'acode_vec1' represents a codeword obtained by arithmetic-coding the second subvector (subvector 1) using the arithmetic model defined as the ArModel value. 'acode_sign' represents a codeword obtained by arithmetic-coding the sign bit using the arithmetic model defined in Table 5.15.

TABLE 5.15

Sign arithmetic model

| size | Cumulative frequencies |
|---|---|
| 2 | 8192, 0 |

While the number of bits used in coding the respective subvectors are calculated and compared with the number of available bits for the respective enhancement layers, when the used bits are equal to or more than the available bits, the coding of the next enhancement layer is newly started.

In the case of a long block, the bandwidth of the base layer is limited up to the 21st scale factor band. Then, the scale factors up to the 21st scale factor band and the arithmetic coding models of the corresponding coding bands are coded. The bit allocation information is obtained from the arithmetic coding models. The maximum value of the allocated bits is obtained from the bit information allocated to each coding band, and coding is performed from the maximum quantization bit value by the aforementioned encoding method. Then, the next quantized bits are sequentially coded. If allocated bits of a certain band are less than those of the band being currently coded, coding is not performed. When allocated bits of a certain band are the same as those of the band being currently coded, the band is coded for the first time. Since the bitrate of the base layer is 16 Kbps, the entire bit allowance is 336 bits. Thus, the total used bit quantity is calculated continuously and coding is terminated at the moment the bit quantity exceeds 336.

After all bitstreams for the base layer (16 Kbps) are formed, the bitstreams for the next enhancement layer are formed. Since the limited bandwidths are increased for the higher layers, the coding of scale factors and arithmetic coding models is performed only for the newly added bands to the limited bands for the base layer. In the base layer, uncoded bit-sliced data for each band and the bit-sliced data of a newly added band are coded from the MSBs in the same manner as in the base layer. When the total used bit quantity is larger than the available bit quantity, coding is terminated and preparation for forming the next enhancement layer bitstreams is made. In this manner, bitstreams for the remaining layers of 32, 40, 48, 56 and 64 Kbps can be generated.

2. Decoding procedure 2.1. Analysis and decoding of bitstreams 2.1.1. Decoding of bsac_channel_stream The decoding of bsac_channel_stream is performed in the following order. First, max_scale factor is obtained. Then, ics_info ( ) is obtained. If TNS data is present, TNS data is obtained. If there are two channels, stereo_mode is obtained and then BSAC data is obtained.

2.1.2. Decoding of bsac__data

The side information necessary in decoding frame__length, encoded__layer, scale factor models and arithmetic models is decoded in the bitstream.

2.1.3. Decoding of bsac__stream

The BSAC streams have a layered structure. First, the side information for the base layer is separated from the bit-stream and then arithmetic-decoded. Then, the bit-sliced information for the quantized frequency components is separated from the bitstream and then arithmetic-decoded. Then, the side information for the next enhancement layer is decoded and the bit-sliced information for the quantized frequency components is arithmetic-decoded.

The decoding of side information for the respective enhancement layers and the decoding of bit-sliced data are repeatedly performed until the enhancement layer is larger than the coded layer.

2.1.4. Decoding of stereo__info or ms__used

The decoding of stereo__info or ms__used is influenced by stereo__mode representing a stereo mask. If the stereo__mode is 0 or 1, the decoding of stereo__info or ms__used is not necessary.

If the stereo__mode is 1, all of the ms__used are 1. The information for the ms__used is transmitted to the M/S stereo processing portion so that M/S stereo processing occurs. If the stereo__mode is 2, the value of the ms__used is arithmetic-decoded using the model demonstrated in Table 5.13. Also, the information for the ms__used is transmitted to the M/S stereo processing portion so that M/S stereo processing occurs.

TABLE 5.13 ms__used model

| size | Cumulative frequencies |
|---|---|
| 2 | 11469, 0 |

If the stereo__mode is 3, the stereo__info is arithmetic-decoded using the model demonstrated in Table 5.14. The decoded data is transmitted to the M/S stereo processing portion or the intensity stereo processing portion so that M/S stereo processing or intensity stereo processing occurs in units of scale factor bands, as described in AAC.

TABLE 5.14 stereo__info model

| size | Cumulative frequencies |
|---|---|
| 2 | 13926, 4096, 1638, 0 |

2.1.5. Decoding of bsac__side__info

The scalable bitstreams formed in the above have a layered structure. First, the side information for the base layer is separated from the bitstream and then decoded. Then, the bit-sliced information for the quantized frequency components contained in the bitstream of the base layer is separated from the bitstream and then decoded. The same decoding procedure as that for the base layer is applied to other enhancement layers.

2.1.5.1. Decoding of scale factors

The frequency components are divided into scale factor bands having frequency coefficients that are multiples of 4. Each scale factor band has a scale factor. There are two methods for decoding scale factors. The method to be used is known from scf__coding value.

First, the max__scalefactor is decoded into an 8-bit unsigned integer. Generally, during coding, values obtained by mapping differences are coded. Thus, for the respective scale factor bands, the mapped values are arithmetic-decoded using models demonstrated in Table 5.2. At this time, if the arithmetic-decoded value is 54, which means that the mapped value is greater than or equal to 54, since the difference between 54 and the mapped value is coded again, the coded difference is decoded again to be restored into a value greater than or equal to 54. If the decoding of the mapped values is completed, the mapped values are inversely mapped by a difference signal. The mapping and the inverse mapping are performed using mapping tables demonstrated in Tables 5.1 and 5.2. The first scale factor can be obtained using the difference signal between max__scalefactor and itself.

TABLE 5.1

Differential scale factor to index transition table

| D | I |
|---|---|
| 0 | 68 |
| 1 | 69 |
| 2 | 70 |
| 3 | 71 |
| 4 | 75 |
| 5 | 76 |
| 6 | 77 |
| 7 | 78 |
| 8 | 79 |
| 9 | 80 |
| 10 | 81 |
| 11 | 82 |
| 12 | 83 |
| 13 | 84 |
| 14 | 85 |
| 15 | 86 |
| 16 | 87 |
| 17 | 88 |
| 18 | 89 |
| 19 | 72 |
| 20 | 90 |
| 21 | 73 |
| 22 | 65 |
| 23 | 66 |
| 24 | 58 |
| 25 | 67 |
| 26 | 59 |
| 27 | 60 |
| 28 | 61 |
| 29 | 62 |
| 30 | 54 |
| 31 | 55 |
| 32 | 46 |
| 33 | 47 |
| 34 | 48 |
| 35 | 49 |
| 36 | 50 |
| 37 | 51 |
| 38 | 41 |
| 39 | 42 |
| 40 | 35 |
| 41 | 36 |
| 42 | 37 |
| 43 | 29 |
| 44 | 38 |
| 45 | 30 |
| 46 | 23 |
| 47 | 24 |
| 48 | 25 |
| 49 | 19 |
| 50 | 20 |
| 51 | 14 |
| 52 | 15 |
| 53 | 16 |
| 54 | 11 |

TABLE 5.1-continued

Differential scale factor to index transition table

| D | I |
|---|---|
| 55 | 7 |
| 56 | 8 |
| 57 | 5 |
| 58 | 2 |
| 59 | 1 |
| 60 | 0 |
| 61 | 3 |
| 62 | 4 |
| 63 | 6 |
| 64 | 9 |
| 65 | 10 |
| 66 | 12 |
| 67 | 13 |
| 68 | 17 |
| 69 | 18 |
| 70 | 21 |
| 71 | 22 |
| 72 | 26 |
| 73 | 27 |
| 74 | 28 |
| 75 | 31 |
| 76 | 32 |
| 77 | 33 |
| 78 | 34 |
| 79 | 39 |
| 80 | 40 |
| 81 | 43 |
| 82 | 44 |
| 83 | 45 |
| 84 | 52 |
| 85 | 53 |
| 86 | 63 |
| 87 | 56 |
| 88 | 64 |
| 89 | 57 |
| 90 | 74 |
| 91 | 91 |
| 92 | 92 |
| 93 | 93 |
| 94 | 94 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |
| 124 | 124 |
| 125 | 125 |
| 126 | 126 |
| 127 | 127 |

TABLE 5.2

Index to differential scale factor transition table

| I | D |
|---|---|
| 0 | 60 |
| 1 | 59 |
| 2 | 58 |
| 3 | 61 |
| 4 | 62 |
| 5 | 57 |
| 6 | 63 |
| 7 | 55 |
| 8 | 56 |
| 9 | 64 |
| 10 | 65 |
| 11 | 54 |
| 12 | 66 |
| 13 | 67 |
| 14 | 51 |
| 15 | 52 |
| 16 | 53 |
| 17 | 68 |
| 18 | 69 |
| 19 | 49 |
| 20 | 50 |
| 21 | 70 |
| 22 | 71 |
| 23 | 46 |
| 24 | 47 |
| 25 | 48 |
| 26 | 72 |
| 27 | 73 |
| 28 | 74 |
| 29 | 43 |
| 30 | 45 |
| 31 | 75 |
| 32 | 76 |
| 33 | 77 |
| 34 | 78 |
| 35 | 40 |
| 36 | 41 |
| 37 | 42 |
| 38 | 44 |
| 39 | 79 |
| 40 | 80 |
| 41 | 38 |
| 42 | 39 |
| 43 | 81 |
| 44 | 82 |
| 45 | 83 |
| 46 | 32 |
| 47 | 33 |
| 48 | 34 |
| 49 | 35 |
| 50 | 36 |
| 51 | 37 |
| 52 | 84 |
| 53 | 85 |
| 54 | 30 |
| 55 | 31 |
| 56 | 87 |
| 57 | 89 |
| 58 | 24 |
| 59 | 26 |
| 60 | 27 |
| 61 | 28 |
| 62 | 29 |
| 63 | 86 |
| 64 | 88 |
| 65 | 22 |
| 66 | 23 |
| 67 | 25 |
| 68 | 0 |
| 69 | 1 |
| 70 | 2 |
| 71 | 3 |
| 72 | 19 |
| 73 | 21 |
| 74 | 90 |

TABLE 5.2-continued

Index to differential scale factor transition table

| I | D |
|---|---|
| 75 | 4 |
| 76 | 5 |
| 77 | 6 |
| 78 | 7 |
| 79 | 8 |
| 80 | 9 |
| 81 | 10 |
| 82 | 11 |
| 83 | 12 |
| 84 | 13 |
| 85 | 14 |
| 86 | 15 |
| 87 | 16 |
| 88 | 17 |
| 89 | 18 |
| 90 | 20 |
| 91 | 91 |
| 92 | 92 |
| 93 | 93 |
| 94 | 94 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |
| 124 | 124 |
| 125 | 125 |
| 126 | 126 |
| 127 | 127 |

Second, the max__scalefactor is decoded into 8-bit unsigned integer. For all scale factors, differences between an offset value, i.e., the max__scalefactor and all scale factors are arithmetic-decoded. The scale factors can be obtained by subtracting the difference signals from the max__scalefactor. The arithmetic models used in decoding the differences are one of the elements forming the bitstreams, and are separated from the bitstreams that have already been decoded.

The following pseudo code describes the decoding method for the scale factors in the base layer and the other enhancement layers.

```
for (ch=0; ch<nch; ch++)
  if (scf__coding[ch]==1)
    for (g=0; g<num__window__group; g++)
      for(sfb=layer__sfb[layer]; sfb<layer__sfb[layer+1];
        sfb++) {
          sf[ch][g][sfb]=max__scalefactor-arithmetic__
            decoding( );
            }
          }
  }
    else {
      for (g=0; g<num__window__group; g++) {
          for(sfb=layer__sfb[layer]; sfb<layer__sfb[layer+
            1]; sfb++)
            tmp__index=arithmetic__decoding( );
            if (tmp__index==54)
            tmp__index=54+arithmetic__decoding( );
            if (sfb==0)
            tmp__index=max__scalefactor-tmp__index;
            else
            tmp__index=sf[ch][g][sfb-1]-tmp__index;
            sf[ch][g][sfb]=index2sf[tmp__index];
            }
            }
          }
}
```

Here, layer__sfb[layer] is a start scale factor band for decoding scale factors in the respective enhancement layers, and layer__sfb[layer+1] is an end scale factor band.

2.1.5.2. Decoding of arithmetic model index

The frequency components are divided into coding bands having 32 frequency coefficients to be losslessly coded. The coding band is a basic unit used in the lossless coding.

The arithmetic coding model index is information on the models used in arithmetic-coding/decoding the bit-sliced data of each coding band, indicating which model is used in the arithmetic-coding/decoding procedures, among the models listed in Table 4.4.

TABLE 4.4

BSAC Arithmetic Model Parameters

| ArModel index | Allocated bits of coding band | Model listed table | ArModel index | Allocated bits of coding band | Model listed table |
|---|---|---|---|---|---|
| 0 | 0 | Table 6.1 | 16 | 8 | Table 6.16 |
| 1 | — | Not used | 17 | 8 | Table 6.17 |
| 2 | 1 | Table 6.2 | 18 | 9 | Table 6.18 |
| 3 | 1 | Table 6.3 | 19 | 9 | Table 6.19 |
| 4 | 2 | Table 6.4 | 20 | 10 | Table 6.20 |
| 5 | 2 | Table 6.5 | 21 | 10 | Table 6.21 |
| 6 | 3 | Table 6.6 | 22 | 11 | Table 6.22 |
| 7 | 3 | Table 6.7 | 23 | 11 | Table 6.23 |
| 8 | 4 | Table 6.8 | 24 | 12 | Table 6.24 |
| 9 | 4 | Table 6.9 | 25 | 12 | Table 6.25 |
| 10 | 5 | Table 6.10 | 26 | 13 | Table 6.26 |
| 11 | 5 | Table 6.11 | 27 | 13 | Table 6.27 |
| 12 | 6 | Table 6.12 | 28 | 14 | Table 6.28 |
| 13 | 6 | Table 6.13 | 29 | 14 | Table 6.29 |
| 14 | 7 | Table 6.14 | 30 | 15 | Table 6.30 |
| 15 | 7 | Table 6.15 | 31 | 15 | Table 6.31 |

Differences between an offset value and all arithmetic coding model indices are calculated and then difference signals are arithmetic-coded using the models listed in Table 4.3. Here, among four models listed in Table 4.3, the model to be used is indicated by the value of ArModel__model and is stored in the bitstream as 2 bits. The offset value is a 5-bit min__ArModel value stored in the bitstream. The difference signals are decoded in the reverse order of the coding procedure and then the difference signals are added to the offset value to restore the arithmetic coding model indices.

the following pseudo code describes the decoding method for the arithmetic coding model indices and ArModel[cband] in the respective enhancement layers.

```
for (ch=0; ch<nch; ch++)
  for (sfb=layer__sfb[layer]; sfb<layer__sfb[layer]; sfb++)
    for (g=0: g<num__window__group; g++) {
      band=(sfb*num__window__group)) +g
      for (i–0;swb__offset[band];i<swb__offset]band+1]
        ;i+=4{
        cband=index2cb(g, i);
      if (!decode__cband[ch][g][cband]){
        ArModel[g][cband]=min__ArModel+
          arithmetic__decoding ( );
        decode__cband[ch][g][cband]=1;
          }
          }
          }
```

Here, layer__sfb[layer] is a start scale factor band for decoding arithmetic coding model indices in the respective enhancement layers, and layer__sfb[layer+1] is an end scale factor band. decode__cband[ch][g][cband] is a flag indicative of whether an arithmetic coding model has been decoded (1) or has not been decoded (0).

2.1.6. Decoding of bit-sliced data

The quantized sequences are formed as bit-sliced sequences. The respective four-dimensional vectors are subdivided into two subvectors according to their state. For effective compression, the two subvectors are arithmetic-coded as a lossless coding. The model to be used in the arithmetic coding for each coding band is decided. This information is stored in the ArModel.

As demonstrated in Tables 6.1 through 6.31, the respective arithmetic-coding models are composed of several low-order models. The subvectors are coded using one of the low-order models. The low-order models are classified according to the dimension of the subvector to be coded, the significance of a vector or the coding states of the respective samples. The significance of a vector is decided by the bit position of the vector to be coded. In other words, according to whether the bit-sliced information is for the MSB, the next MSB, or the LSB, the significance of a vector differs. The MSB has the highest significance and the LSB has the lowest significance. The coding state values of the respective samples are renewed as the vector coding is progressed from the MSB to the LSB. At first, the coding state value is initialized as zero. Then, when a non-zero bit value is encountered, the coding state value becomes 1.

[Table 6.1] BSAC Arithmetic Model 0

Allocated bit=0
BSAC arithmetic model 1
Not used

[Table 6.2] BSAC Arithmetic Model 2

Allocated bit = 1

| snf | pre__state | dimension | Cumulative frequencies |
|---|---|---|---|
| 1 | 0 | 4 | 14858, 13706, 12545, 11545, 10434, 9479, 8475, 7619, 6457, 5456, 4497, 3601, 2600, 1720, 862, 0 |

[Table 6.3] BSAC Arithmetic Model 3

Allocated bit = 1

| snf | pre__state | dimension | Cumulative frequencies |
|---|---|---|---|
| 1 | 0 | 4 | 5476, 4279, 3542, 3269, 2545, 2435, 2199, 2111, 850, 739, 592, 550, 165, 21, 0 |

[Table 6.4] BSAC Arithmetic Model 4

Allocated bits = 2

| snf | pre__state | dimension | Cumulative frequencies |
|---|---|---|---|
| 2 | 0 | 4 | 4299, 3445, 2583, 2473, 1569, 1479, 1371, 1332, 450, 347, 248, 219, 81, 50, 15, 0 |
| 1 | 0 | 4 | 15290, 14389, 13434, 12485, 11559, 10627, 9683, 8626, 7691, 5767, 4655, 3646, 2533, 1415, 0 |
| | | 3 | 15139, 13484, 11909, 9716, 8068, 5919, 3590, 0 |
| | | 2 | 14008, 10384, 6834, 0 |
| | | 1 | 11228, 0 |
| | 1 | 4 | 10355, 9160, 7553, 7004, 5671, 4902, 4133, 3433, 1908, 1661, 1345, 1222, 796, 714, 233, 0 |
| | | 3 | 8328, 6615, 4466, 3586, 1759, 1062, 321, 0 |
| | | 2 | 4631, 2696, 793, 0 |
| | | 1 | 968, 0 |

[Table 6.5] BSAC Arithmetic Model 5

Allocated bits = 2

| snf | pre__state | dimension | Cumulative frequencies |
|---|---|---|---|
| 2 | 0 | 4 | 3119, 2396, 1878, 1619, 1076, 1051, 870, 826, 233, 231, 198, 197, 27, 26, 1, 0 |
| 1 | 0 | 4 | 3691, 2897, 2406, 2142, 1752, 1668, 1497, 1404, 502, 453, 389, 368, 131, 102, 18, 0 |
| | | 3 | 11106, 8393, 6517, 4967, 2739, 2200, 608, 0 |
| | | 2 | 10771, 6410, 2619, 0 |
| | | 1 | 6112, 0 |
| | 1 | 4 | 11484, 10106, 7809, 7043, 5053, 3521, 2756, 2603, 2296, 2143, 1990, 1531, 765, 459, 153, 0 |
| | | 3 | 10628, 8930, 6618, 4585, 2858, 2129, 796, 0 |
| | | 2 | 7596, 4499, 1512, 0 |
| | | 1 | 4155, 0 |

[Table 6.6] BSAC Arithmetic Model 6

Allocated bits = 3

| snf | pre__state | dimension | Cumulative frequencies |
|---|---|---|---|
| 3 | 0 | 4 | 2845, 2371, 1684, 1524, 918, 882, 760, 729, 200, 198, 180, 178, 27, 25, 1, 9 |
| 2 | 0 | 4 | 1621, 1183, 933, 775, 645, 628, 516, 484, 210, 207, 188, 186, 39, 35, 1, 0 |
| | | 3 | 8800, 6734, 4886, 3603, 1326, 1204, 104, 0 |
| | | 2 | 8869, 5163, 1078, 0 |
| | 1 | 4 | 12603, 12130, 10082, 9767, 8979, 8034, 7404, 6144, 4253, 3780, 3150, 2363, 1575, 945, 630, 0 |
| | | 3 | 10410, 8922, 5694, 4270, 2656, 1601, 533, 0 |
| | | 2 | 8459, 5107, 1670, 0 |
| | | 1 | 4003, 0 |
| 1 | 0 | 4 | 5185, 4084, 3423, 3010, 2406, 2289, 2169, 2107, 650, 539, 445, 419, 97, 61, 15, 0 |
| | | 3 | 13514, 11030, 8596, 6466, 4345, 3250, 1294, 0 |
| | | 2 | 13231, 8754, 4635, 0 |
| | | 1 | 9876, 0 |

-continued

| | | | |
|---|---|---|---|
| | 1 | 4 | 14091, 12522, 11247, 10299, 8928, 7954, 6696, 6024, 4766, 4033, 3119, 2508, 1594, 1008, 353, 0 |
| | | 3 | 12596, 10427, 7608, 6063, 3782, 2580, 928, 0 |
| | | 2 | 10008, 6213, 2350, 0 |
| | | 1 | 5614, 0 |

[Table 6.7] BSAC Arithmetic Model 7

Allocated bits = 3

| snf | pre_state | dimension | Cumulative frequencies |
|---|---|---|---|
| 3 | 0 | 4 | 3833, 3187, 2542, 2390, 1676, 1605, 1385, 1337, 468, 434, 377, 349, 117, 93, 30, 0 |
| 2 | 0 | 4 | 6621, 5620, 4784, 4334, 3563, 3307, 2923, 2682, 1700, 1458, 1213, 1040, 608, 431, 191, 0 |
| | | 3 | 11369, 9466, 7519, 6138,, 3544, 2441, 1136, 0 |
| | | 2 | 11083, 7446, 3439, 0 |
| | | 1 | 8823, 0 |
| | 1 | 4 | 12027, 11572, 9947, 9687, 9232, 8126, 7216, 6176, 4161, 3705, 3055, 2210, 1235, 780, 455, 0 |
| | | 3 | 9566, 7943, 4894, 3847, 2263, 1596, 562, 0 |
| | | 2 | 7212, 4217, 1240, 0 |
| | | 1 | 3296, 0 |
| 1 | 0 | 4 | 14363, 13143, 12054, 11153, 10220, 9388, 8609, 7680, 6344, 5408, 4578, 3623, 2762, 1932, 1099, 0 |
| | | 3 | 14785, 13256, 11596, 9277, 7581, 5695, 3348, 0 |
| | | 2 | 14050, 10293, 6547, 0 |
| | | 1 | 10948, 0 |
| | 1 | 4 | 13856, 12350, 11151, 10158, 8816, 7913, 6899, 6214, 4836, 4062, 3119, 2505, 1624, 1020, 378, 0 |
| | | 3 | 12083, 9880, 7293, 5875, 3501, 2372, 828, 0 |
| | | 2 | 8773, 5285, 1799, 0 |
| | | 1 | 4452, 0 |

[Table 6.8] BSAC Arithmetic Model 8

Allocated bits = 4

| snf | pre_state | dimension | Cumulative frequencies |
|---|---|---|---|
| 4 | 0 | 4 | 2770, 2075, 1635, 1511, 1059, 1055, 928, 923, 204, 202, 190, 188, 9, 8, 1, 0 |
| 3 | 0 | 4 | 1810, 1254, 1151, 1020, 788, 785, 767, 758, 139, 138, 133, 132, 14, 13, 1, 0 |
| | | 3 | 7113, 4895, 3698, 3193, 1096, 967, 97, 0 |
| | | 2 | 6858, 4547, 631, 0 |
| | | 1 | 4028, 0 |
| | 1 | 4 | 13263, 10922, 10142, 9752, 8582, 7801, 5851, 5071, 3510, 3120, 2730, 2340, 1560, 780, 390, 0 |
| | | 3 | 12675, 11275, 7946, 6356, 4086, 2875, 1097, 0 |
| | | 2 | 9473, 5781, 1840, 0 |
| | | 1 | 3597, 0 |
| 2 | 0 | 4 | 2600, 1762, 1459, 1292, 989, 983, 921, 916, 238, 233, 205, 202, 32, 30, 3, 0 |
| | | 3 | 10797, 8840, 6149, 5050,2371, 1697, 483, 0 |
| | | 2 | 10571, 6942, 2445, 0 |
| | | 1 | 7864, 0 |
| | 1 | 4 | 14866, 12983, 11297, 10398, 9386, 8683, 7559, 6969, 5451, 4721, 3484, 3007, 1882, 1208, 590, 0 |
| | | 3 | 12611, 10374, 8025, 6167, 4012, 2608, 967, 0 |
| | | 2 | 10043, 6306, 2373, 0 |

-continued

| | | | |
|---|---|---|---|
| | | 1 | 5766, 0 |
| 1 | 0 | 4 | 6155, 5057, 4328, 3845, 3164, 2977, 2728, 2590, 1341, 1095, 885, 764, 303, 188, 74, 0 |
| | | 3 | 12802, 10407, 8142, 6263, 3928, 3013, 1225, 0 |
| | | 2 | 13131, 9420, 4928, 0 |
| | | 1 | 10395, 0 |
| | 1 | 4 | 14536, 13348, 11819, 11016, 9340, 8399, 7135, 6521, 5114, 4559, 3521, 2968, 1768, 1177, 433, 0 |
| | | 3 | 12735, 10606, 7861, 6011, 3896, 2637, 917, 0 |
| | | 2 | 9831, 5972, 2251, 0 |
| | | 1 | 4944, 0 |

[Table 6.9] BSAC Arithmetic Model 9

Allocated bits = 4

| snf | pre_state | dimension | Cumulative frequencies |
|---|---|---|---|
| 4 | 0 | 4 | 3383, 2550, 1967, 1794, 1301, 1249, 1156, 1118, 340, 298, 247, 213, 81, 54, 15, 0 |
| 3 | 0 | 4 | 7348, 6275, 5299, 4935, 3771, 3605, 2962, 2818, 1295, 1143, 980, 860, 310, 230, 75, 0 |
| | | 3 | 9531, 7809, 5972, 4892, 2774, 1782, 823, 0 |
| | | 2 | 11455, 7068, 3383, 0 |
| | | 1 | 9437, 0 |
| | 1 | 4 | 12503, 9701, 8838, 8407, 6898, 6036, 4527, 3664, 2802, 2586, 2371, 2155, 1293, 431, 215, 0 |
| | | 3 | 11268, 9422, 6508, 5277, 3076, 2460, 1457, 0 |
| | | 2 | 7631, 3565, 1506, 0 |
| | | 1 | 2639, 0 |
| 2 | 0 | 4 | 11210, 9646, 8429, 7389, 6252, 5746, 5140, 4692, 3350, 2880, 2416, 2014, 1240, 851, 404, 0 |
| | | 3 | 12143, 10250, 7784, 6445, 3954, 2528, 1228, 0 |
| | | 2 | 10891, 7210, 3874, 0 |
| | | 1 | 9537, 0 |
| | 1 | 4 | 14988, 13408, 11860, 10854, 9631, 8992, 7834, 7196, 5616, 4793, 3571, 2975, 1926, 1212, 627, 0 |
| | | 3 | 12485, 10041, 7461, 5732, 3669, 2361, 940, 0 |
| | | 2 | 9342, 5547, 1963, 0 |
| | | 1 | 5410, 0 |
| 1 | 0 | 4 | 14152, 13258, 12486, 11635, 11040, 10290, 9740, 8573, 7546, 6643, 5903, 4928, 4005, 2972, 1751, 0 |
| | | 3 | 14895, 13534, 12007, 9787, 8063, 5761, 3570, 0 |
| | | 2 | 14088, 10108, 6749, 0 |
| | | 1 | 11041, 0 |
| | 1 | 4 | 14817, 13545, 12244, 11281, 10012, 8952, 7959, 7136, 5791, 4920, 3997, 3126, 2105, 1282, 623, 0 |
| | | 3 | 12873, 10678, 8257, 6573, 4186, 2775, 1053, 0 |
| | | 2 | 9969, 6059, 2363, 0 |
| | | 1 | 5694, 0 |

[Table 6.10] BSAC Arithmetic Model 10

Allocated bits (Abit) = 5

| snf | pre_state | dimension | Cumulative frequencies |
|---|---|---|---|
| Abit | 0 | 4 | 2335, 1613, 1371, 1277, 901, 892, 841, 833, 141, 140, 130, 129, 24, 23, 1, 0 |
| Abit-1 | 0 | 4 | 1746, 1251, 1038, 998, 615, 611, 583, 582, 106, 104, 101, 99, 3, 2, 1, 0 |
| | | 3 | 7110, 5230, 4228, 3552, 686, 622, 46, 0 |

-continued

| | | | |
|---|---|---|---|
| | | 2 | 6101, 2575, 265, 0 |
| | | 1 | 1489, 0 |
| | 1 | 4 | 13010, 12047, 11565, 11083, 9637, 8673, 6264, 5782, 4336, 3855, 3373, 2891, 2409, 1927, 963, 0 |
| | | 3 | 10838, 10132, 8318, 7158, 5595, 3428, 2318, 0 |
| | | 2 | 8209, 5197, 1287, 0 |
| | | 1 | 4954, 0 |
| Abit-2 | 0 | 4 | 2137, 1660, 1471, 1312, 1007, 1000, 957, 951, 303, 278, 249, 247, 48, 47, 1, 0 |
| | | 3 | 9327, 7413, 5073, 4391, 2037, 1695, 205, 0 |
| | | 2 | 8658, 5404, 1628, 0 |
| | | 1 | 5660, 0 |
| | 1 | 4 | 13360, 12288, 10727, 9752, 8484, 7899, 7119, 6631, 5363, 3900, 3023, 2535, 1852, 1267, 585, 0 |
| | | 3 | 13742, 11685, 8977, 7230, 5015, 3427, 1132, 0 |
| | | 2 | 10402, 6691, 2828, 0 |
| | | 1 | 5298, 0 |
| Abit-3 | 0 | 4 | 4124, 3181, 2702, 2519, 1949, 1922, 1733, 1712, 524, 475, 425, 407, 78, 52, 15, 0 |
| | | 3 | 10829, 8581, 6285, 4865, 2539, 1920, 594, 0 |
| | | 2 | 11074, 7282, 3092, 0 |
| | | 1 | 8045, 0 |
| | 1 | 4 | 14541, 13343, 11637, 10862, 9328, 8783, 7213, 6517, 5485, 5033, 4115, 3506, 2143, 1555, 509, 0 |
| | | 3 | 13010, 11143, 8682, 7202, 4537, 3297, 1221, 0 |
| | | 2 | 9941, 5861, 2191, 0 |
| | | 1 | 5340, 0 |
| Other snf | 0 | 4 | 9845, 8235, 7126, 6401, 5551, 5131, 4664, 4320, 2908, 2399, 1879, 1506, 935, 603, 277, 0 |
| | | 3 | 13070, 11424, 9094, 7203, 4771, 3479, 1486, 0 |
| | | 2 | 13169, 9298, 5406, 0 |
| | | 1 | 10371, 0 |
| | 1 | 4 | 14766, 13685, 12358, 11442, 10035, 9078, 7967, 7048, 5824, 5066, 4058, 3400, 2350, 1612, 659, 0 |
| | | 3 | 13391, 11189, 8904, 7172, 4966, 3183, 1383, 0 |
| | | 2 | 10280, 6372, 2633, 0 |
| | | 1 | 5419, 0 |

[Table 6.11] BSAC Arithmetic Model 11

Allocated bits (Abit) = 5

| snf | pre_state | dimension | Cumulative frequencies |
|---|---|---|---|
| Abit | 0 | 4 | 2872, 2294, 1740, 1593, 1241, 1155, 1035, 960, 339, 300, 261, 247, 105, 72, 34, 0 |
| Abit-1 | 0 | 4 | 3854, 3090, 2469, 2276, 1801, 1685, 1568, 1505, 627, 539, 445, 400, 193, 141, 51, 0 |
| | | 3 | 10654, 8555, 6875, 4976, 3286, 2229, 826, 0 |
| | | 2 | 10569, 6180, 2695, 0 |
| | | 1 | 6971, 0 |
| | 1 | 4 | 11419, 11170, 10922, 10426, 7943, 6950, 3723, 3475, 1737, 1489, 1241, 992, 744, 496, 248, 0 |
| | | 3 | 11013, 9245, 6730, 496;2, 3263, 3263, 1699, 883, 0 |
| | | 2 | 6969, 4370, 1366, 0 |
| | | 1 | 3166, 0 |
| Abit-2 | 0 | 4 | 9505, 8070, 6943, 6474, 5305, 5009, 4290, 4029, 2323, 1911, 1591, 1363, 653, 443, 217, 0 |
| | | 3 | 11639, 9520, 7523, 6260, 4012, 2653, 1021, 0 |
| | | 2 | 12453, 8284, 4722, 0 |
| | | 1 | 9182, 0 |
| | 1 | 4 | 13472, 122294, 10499, 9167, 7990, 7464, 6565, 6008, 4614, 3747, 2818, 2477, 1641, 1084, 557, 0 |
| | | 3 | 13099, 10826, 8476, 6915, 4488, 2966, 1223, 0 |
| | | 2 | 9212, 5772, 2053, 0 |
| | | 1 | 4244, 0 |
| Abit-3 | 0 | 4 | 14182, 12785, 11663, 10680, 9601, 8748, 8135, 7353, 6014, 5227, 4433, 3727, 2703, 1818, 866, 0 |
| | | 3 | 13654, 11814, 9714, 7856, 5717, 3916, 2112, 0 |
| | | 2 | 12497, 8501, 4969, 0 |
| | | 1 | 10296, 0 |
| | 1 | 4 | 15068, 13770, 12294, 11213, 10230, 9266, 8439, 7438, 6295, 5368, 4361, 3620, 2594, 1797, 895, 0 |
| | | 3 | 13120, 10879, 8445, 6665, 4356, 2794, 1047, 0 |
| | | 2 | 9311, 5578, 1793, 0 |
| | | 1 | 4695, 0 |
| Other snf | 0 | 4 | 15173, 14794, 14359, 13659, 13224, 12600, 11994, 11067, 10197, 9573, 9081, 7624, 6697, 4691, 3216, 0 |
| | | 3 | 15328, 13985, 12748, 10084, 8587, 6459, 4111, 0 |
| | | 2 | 14661, 11179, 7924, 0 |
| | | 1 | 11399, 0 |
| | 1 | 4 | 14873, 13768, 12458, 11491, 10229, 9164, 7999, 7186, 5992, 5012, 4119, 3369, 2228, 1427, 684, 0 |
| | | 3 | 13063, 10913, 8477, 6752, 4529, 3047, 1241, 0 |
| | | 2 | 10101, 6369, 2615, 0 |
| | | 1 | 5359, 0 |

[Table 6.12] BSAC Arithmetic Modeld 12
Same as BSAC arithmetic model 10, but allocated bit=6

[Table 6.13] BSAC Arithmetic Modeld 13
Same as BSAC arithmetic model 11, but allocated bit=6

[Table 6.14] BSAC Arithmetic Modeld 14
Same as BSAC arithmetic Modeld 10, but allocated bit=7

[Table 6.15] BSAC Arithmetic Modeld 15
Same as BSAC arithmetic model 11, but allocated bit=7

[Table 6.16] BSAC Arithmetic Modeld 16
Same as BSAC arithmetic model 10, but allocated bit=8

[Table 6.17] BSAC Arithmetic Modeld 17
Same as BSAC arithmetic model 11, but allocated bit=8

[Table 6.18] BSAC Arithmetic Modeld 18
Same as BSAC arithmetic model 10, but allocated bit=9

[Table 6.19] BSAC Arithmetic Modeld 19
Same as BSAC arithmetic model 11, but allocated bit=9

[Table 6.20] BSAC Arithmetic Modeld 20
Same as BSAC arithmetic model 10, but allocated bit=10

[Table 6.21] BSAC Arithmetic Modeld 21
Same as BSAC arithmetic model 11, but allocated bit=10

[Table 6.22] BSAC Arithmetic Modeld 22
Same as BSAC arithmetic model 10, but allocated bit=11

[Table 6.23] BSAC Arithmetic Modeld 23
Same as BSAC arithmetic model 11, but allocated bit=11

[Table 6.24] BSAC Arithmetic Modeld 24

Same as BSAC arithmetic model 10, but allocated bit=12

[Table 6.25] BSAC Arithmetic Modeld 25

Same as BSAC arithmetic model 11, but allocated bit=12

[Table 6.26] BSAC Arithmetic Modeld 26

Same as BSAC arithmetic model 10, but allocated bit=13

[Table 6.27] BSAC Arithmetic Modeld 27

Same as BSAC arithmetic model 11, but allocated bit=13

[Table 6.28] BSAC Arithmetic Modeld 28

Same as BSAC arithmetic Model 10, but allocated bit=14

[Table 6.29] BSAC Arithmetic Modeld 29

Same as BSAC arithmetic model 11, but allocated bit=14

[Table 6.30] BSAC Arithmetic Modeld 30

Same as BSAC arithmetic model 10, but allocated bit=15

[Table 6.31] BSAC Arithmetic Modeld 31

Same as BSAC arithmetic model 11, but allocated bit=15

The two subvectors are one- through four-dimensional vectors. The subvectors are arithmetic-coded from the MSB to the LSB, from lower frequency components to higher frequency components. The arithmetic coding model indices used in the arithmetic-coding are previously stored in the bitstream in the order from low frequency to high frequency, before transmitting the bit-sliced data to each coding band in units of coding bands.

The respective bit-sliced data is arithmetic-coded to obtain the codeword indices. These indices are restored into the original quantized data by being bit-coupled using the following pseudo code.

'pre_state[ ]' is a state indicative of whether the currently decoded value is 0 or not. 'snf' is significance of a decoded vector. 'Idx0' is a codeword index whose previous state is 0. 'idx1' is a codeword index whose previous state is 1. 'dec_sample[ ]' is decoded data. 'start_i' is a start frequency line of decoded vectors.

```
for (i=start_i; i<(start_i+4); i++) {
  if (pre_state[i]) {
    if (idx1 & 0x01)
      dec_sample[i]|=(1<<(snf-1))
    idx1>>=1;
  }
  else {
    if (idx0 & 0x01)
      dec_sample[i] |=(1<<(snf-1))
    idx0>>=1;
  }
}
```

While the bit-sliced data of quantized frequency components is coded from the MSB to the LSB, when the sign bits of non-zero frequency coefficients are arithmetic-coded. A negative (−) sign bit is represented by 1 and a positive (+) sign bit is represented by 0.

Therefore, if the bit-sliced data is arithmetic-decoded in a decoder and a non-zero arithmetic-decoded bit value is encountered first, the information of the sign in the bitstream, i.e., acode_sign, follows. The sign_bit is arithmetic-decoded using this information with the models listed in Table 5.9. If the sign_bit is 1, the sign information is given to the quantized data (y) formed by coupling the separated data as follows.

```
if (y !=0)
  if (sign_bit==1)
    y=−Y
```

2.2. M/S stereo processing portion (optional module)

It is known by the flag contained in the bitstream and ms_used[ ] whether an M/S stereo processing module for each scale factor band is used or not. If used, the M/S stereo processing is performed using the same procedure as demonstrated in AAC.

2.3. Predicting portion (Optional module)

It is known by the flag contained in the bitstream and prediction_present whether a predicting module for scale factor band is used or not. If used, the prediction is performed using the same procedure as demonstrated in AAC.

2.4. Intensity stereo processing portion (optional module)

It is known by the flag contained in the bitstream and stereo_info whether a intensity stereo processing module for each scale factor band is used or not. If used, the intensity stereo processing is performed using the same procedure as demonstrated in AAC.

2.5. TNS portion (optional module)

It is known by the flag contained in the bitstream and tns_present whether a TNS module is used or not. If used, the TNS is performed using the procedure demonstrated in AAC.

2.6. Inverse quantization

The inverse quantizing portion restores the decoded scale factors and quantized data into signals having the original magnitudes. The inverse quantizing procedure is described in the AAC standards.

2.7. Frequency/time mapping

The frequency/time mapping portion inversely converts audio signals of a frequency domain into signals of a temporal domain so as to be reproduced by a user. The formula for mapping the frequency domain signal into the temporal domain signal is defined in the AAC standards. Also, various items such as a window related to mapping are also described in the AAC standards.

The present invention allows a similar performance to that of a conventional encoder in which only compression is taken into consideration, at a higher bitrate, so as to process both mono signals and stereo signals to satisfy various user requests, while flexible bitstreams are formed. In other words, by user request, the information for the bitrates of various layers is combined with one bitstream without overlapping, thereby providing bitstreams having good audio quality. Also, no converter is necessary between a transmitting terminal and a receiving terminal. Further, any state of transmission channels and various user requests can be accommodated.

Also, the scalability is applicable to stereo signals as well as mono signals.

The present invention is adoptable to the conventional audio encoding/decoding apparatus having modules for improving coding/decoding efficiency, thereby improving the performance at various bitrates.

Also, in the present invention, while the basic modules used in AAC standard coding/decoding such as time/frequency mapping or quantization are used, only the lossless coding module is replaced with the bit-sliced encoding method to provide scalability.

Since the bitstreams are scalable, one bitstream may contain various bitstreams having several bitrates. Unlike the conventional coders, the scalable coder according to the present invention has finer graded enhancement layers, and thus the application range is broadened.

Also, in contrast with other scalable audio codecs, good audio quality is offered at a higher bitrate.

If the present invention is combined with the AAC standards, almost the same audio quality can be attained at the bitrate of the top layer.

According to the present invention, while using the conventional audio algorithm such as the MPEG-2 AAC standards, only the lossless coding portion is different from the conventional one. Thus, the quantized signals of a frequency domain is decoded in the AAC bitstream, and the BSAC scalable bitstreams can be formed based on the decoded signals. In other words, lossless transcoding is allowed. Also, AAC bitstreams can be formed from BSAC scalable bitstreams in reverse order. Due to these functionalities, various AAC bitstreams formed only for enhancing coding efficiency are convertably used according to its environment. Thus, to allow for scalability, twofold or trifold work for forming bitstreams for providing scalability is not necessary by a separate coding apparatus.

Also, the present invention has good coding efficiency, that is, the best performance is exhibited at a fixed bitrate as in the conventional coding techniques, and relates to a coding/decoding method and apparatus in which the bitrate coded suitable for the advent of multimedia technology is restored. Also, according to the present invention, data for bitrates for various enhancement layers can be represented within one bitstream. Thus, according to the performance of users' decoders and bandwidth/congestion of transmission channels or by the users' request, the sizes of the bitrates or the complexity thereof can be controlled.

What is claimed is:

1. A scalable stereo audio encoding method for coding audio signals into a layered datastream having a base layer and at least two enhancement layers, comprising the steps of:

signal-processing input audio signals and quantizing the same for each predetermined coding band;

coding the quantized data corresponding to the base layer among the quantized data;

coding the quantized data corresponding to the next enhancement layer of the coded base layer and the remaining quantized data uncoded due to a layer size limit and belonging to the coded layer; and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a same predetermined number; and then arithmetic-coded using a predetermined probability model in the order ranging from the MSB sequences to the LSB sequences, bit-sliced left-channel data and right-channel data being alternately coded in units of predetermined vectors.

2. The scalable stereo audio encoding method according to claim 1, wherein the side information includes at least scale factors and information on a probability model to be used in arithmetic coding.

3. The scalable stereo audio encoding method according to claim 1, wherein the predetermined vectors are four-dimensional vectors produced by coupling the four bit-sliced audio channel data into one vector.

4. The scalable stereo audio encoding method according to claim 3, wherein the four-dimensional vectors are divided into two subvectors according to prestates indicating whether non-zero bit-sliced frequency components are coded or not, to then be coded.

5. The scalable stereo audio encoding method according to claim 2, wherein the step of coding the scale factors comprises the steps of:

obtaining the maximum scale factor;

obtaining the difference between the maximum scale factor and the first scale factors and arithmetic-coding the difference; and obtaining differences between the immediately previous arithmetic-coded scale factor and the respective scale factors subsequent to the first scale factor, mapping the differences into a predetermined value and arithmetic-coding the mapped values.

6. The scalable stereo audio encoding method according to claim 5, wherein the probability models listed in Tables 5.1 are used in the mapping step.

7. The scalable stereo audio encoding method according to claim 2, wherein the step of coding the scale factors comprises the steps of:

obtaining the maximum scale factor; and obtaining differences between the maximum scale factor and the respective scale factors and arithmetic-coding the differences.

8. The scalable stereo audio encoding method according to claim 1, wherein the header information commonly used for all bands is coded and the side information and the quantized frequencies necessary for the respective layer are formed by bit-sliced information to then be coded to have a layered structure.

9. The scalable stereo audio encoding method according to claim 1, wherein the quantization is performed by the steps of:

converting the input audio signals of a temporal domain into signals of a frequency domain;

coupling the converted signals as signals of predetermined scale factor bands by time/frequency mapping and calculating a masking threshold at each scale factor band;

performing temporal-noise shaping for controlling the temporal shape of the quantization noise within each window for conversion;

performing intensity stereo processing such that only the quantized information of a scale factor band for one of two channels is coded, and only the scale factor for the other channel is transmitted;

predicting frequency coefficients of the present frame;

performing MIS stereo processing for converting a left-channel signal and a right-channel signal into an additive signal of two signals and a subtractive signal thereof; and quantizing the signals for each predetermined coding band so that quantization noise of each band is smaller than the masking threshold.

10. The scalable stereo audio encoding method according to claim 1, wherein, when the quantized data is composed of sign data and magnitude data, the steps of coding of the base layer and enhancement layers and forming bitstreams comprise the steps of:

arithmetic-coding the most significant digit sequences composed of most significant digits of the magnitude data;

coding sign data corresponding to non-zero data among the coded most significant digit sequences;

coding the most significant digit sequences among uncoded magnitude data of the digital data;

coding uncoded sign data among the sign data corresponding to non-zero magnitude data among coded digit sequences; and performing the magnitude coding step and the sign coding step on the respective digits of the digital data, the respective steps being alternately performed on the left-channel data and the right-channel data in units of predetermined vectors.

11. A scalable stereo audio coding apparatus comprising:

a quantizing portion for signal-processing input audio signals and quantizing the same for each coding band;

a bit-sliced arithmetic-coding portion for coding bitstreams for all layers so as to have a layered structure, by band-limiting for a base layer so as to be scalable, coding side information corresponding to the base layer, coding the quantized information sequentially from the most significant bit sequence to the least significant bit sequence, and from lower frequency components to higher frequency components, alternately coding left-channel data and right-channel data in units of predetermined vectors, and coding side information corresponding to the next enhancement layer of the base layer and the quantized data; and a bitstream forming portion for collecting data formed in the quantizing portion and the bit-sliced arithmetic coding portion and generating bitstreams.

12. The scalable audio coding apparatus according to claim 11, wherein the quantizing portion comprises:

a time/frequency mapping portion for converting the input audio signals of a temporal domain into signals of a frequency domain;

a psychoacoustic portion for coupling the converted signals by signals of predetermined scale factor bands by time/frequency mapping and calculating a masking threshold at each scale factor band using a masking phenomenon generated by interaction of the respective signals; and a quantizing portion for quantizing the signals for each predetermined coding band while the quantization noise of each band is compared with the masking threshold.

13. The scalable audio coding apparatus according to claim 12, further comprising:

a temporal noise shaping (TNS) portion for performing temporal-noise shaping for controlling the temporal shape of the quantization noise within each window for conversion;

an intensity stereo processing portion for performing intensity stereo processing such that only the quantized information of a scale factor band for one of two channels is coded, and only the scale factor for the other channel is transmitted;

a predicting portion for predicting frequency coefficients of the present frame; and an M/S stereo processing portion for performing M/S stereo processing for converting a left-channel signal and a right-channel signal into an additive signal of two signals and a subtractive signal thereof.

14. A scalable stereo audio decoding method for decoding audio data coded to have layered bitrates, comprising the steps of:

analyzing data necessary for the respective modules in the bitstreams having a layered structure;

decoding at least scale factors and arithmetic-coding model indices and quantized data, in the order of creation of the layers in bitstreams having a layered structure, the quantized data decoded alternately for the respective channels by analyzing the significance of bits composing the bitstreams, from upper significant bits to lower significant bits;

restoring the decoded scale factors and quantized data into signals having the original magnitudes; and converting inversely quantized signals into signals of a temporal domain.

15. The scalable stereo audio decoding method according to claim 14, further comprising the steps of:

performing MIS stereo processing for checking whether or not MIS stereo processing has been performed in the bitstream encoding method, and converting a left-channel signal and a right-channel signal into an additive signal of two signals and a subtractive signal thereof if the M/S stereo processing has been performed;

checking whether or not a predicting step has been performed in the bitstream encoding method, and predicting frequency coefficients of the current frame if the checking step has been performed;

checking whether or not an intensity stereo processing step has been performed in the bitstream encoding method, and, if the intensity stereo processing has been performed, then since only the quantized information of the scale factor band for one channel (the left channel) two channels is coded, performing the intensity stereo processing for restoring the quantized information of the other channel (the right channel) into a left channel value; and checking whether or not a temporal noise shaping (TNS) step has been performed in the bitstream encoding method, and if the TNS step has been performed, performing temporal-noise shaping for controlling the temporal shape of the quantization noise within each window for conversion.

16. The scalable stereo audio decoding method according to claim 14, wherein, when the quantized data is composed of sign data and magnitude data, restoring quantized frequency components by sequentially decoding the magnitude data of quantized frequency components sign bits and coupling the magnitude data and sign bits.

17. The scalable stereo audio decoding method according to claim 14, wherein the decoding step is performed from the most significant bits to the lowest significant bits and the restoring step is performed by coupling the decoded bit-sliced data and restoring the coupled data into quantized frequency component data.

18. The scalable stereo audio decoding method according to claim 17, wherein the data is decoded in the decoding step such that bit-sliced information of four samples is decoded into units of four-dimensional vectors.

19. The scalable stereo audio decoding method according to claim 18, wherein the four-dimensional vector decoding is performed such that two subvectors coded according to prestates indicating whether non-zero bit-sliced frequency components are coded or not is arithmetic-decoded, and the two subvectors decoded according to the coding states of the respective samples are. restored into four-dimensional vectors.

20. The scalable stereo audio decoding method according to claim 16, wherein while the bit-sliced data of the respective frequency components is decoded from the MSBs, decoding is skipped if the bit-sliced data is '0' and sign data is arithmetic-decoded when the bit-sliced data '1' appears for the first time.

21. The scalable stereo audio decoding method according to claim 14, wherein the decoding of the scale factors is performed by decoding the maximum scale factor in the bitstream, arithmetic-decoding differences between the maximum scale factor and the respective scale factors, and subtracting the differences from the maximum scale factor.

22. The scalable stereo audio decoding method according to claim 14, wherein the step of decoding the scale factors comprises the steps of:

decoding the maximum scale factor from the bitstreams;

obtaining differences between the maximum scale factor and scale factors to be decoded by mapping and arithmetic-decoding the differences and inversely mapping the differences from the mapped values; and obtaining the first scale factor by subtracting the differences from the maximum scale factor, and obtaining the scale factors for the remaining bands by subtracting the differences from the previous scale factors.

23. The scalable stereo audio decoding method according to claim 14, wherein the decoding of the arithmetic-coded model indices is performed by the steps of:

decoding the minimum arithmetic model index in the bitstream, decoding differences between the minimum index and the respective indices in the side information of the respective layers, and adding the minimum index and the differences.

24. A scalable stereo audio decoding apparatus for decoding audio data coded to have layered bitrates, comprising:

a bitstream analyzing portion for analyzing data necessary for the respective modules in the bitstreams having a layered structure;

a decoding portion for decoding at least scale factors and arithmetic-coding model indices and quantized data, in the order of creation of the layers in bitstreams having a layered structure, the quantized data decoded alternately for the respective channels by analyzing the significance of bits composing the bitstreams, from upper significant bits to lower significant bits;

a restoring portion for restoring the decoded scale factors and quantized data into signals having the original magnitudes; and a frequency/time mapping portion for converting inversely quantized signals into signals of a temporal domain.

25. The scalable stereo audio decoding apparatus according to claim 24, further comprising:

an M/S stereo processing portion for performing M/S stereo processing for checking whether or not M/S stereo processing has been performed in the bitstream encoding method, and converting a left-channel signal and a right-channel signal into an additive signal of two signals and a subtractive signal thereof if the M/S stereo processing has been performed;

a predicting portion for checking whether or not predicting step has been performed in the bitstream encoding method, and predicting frequency coefficients of the current frame if the checking step has been performed;

an intensity stereo processing portion for checking whether or not intensity stereo processing has been performed in the bitstream encoding method, and, if the intensity stereo processing has been performed, then since only the quantized information of the scale factor band for one channel (the left channel) two channels is coded, performing the intensity stereo processing for restoring the quantized information of the other channel (the right channel) into a left channel value; and a temporal noise shaping portion for checking whether or not temporal noise shaping (TNS) step has been performed in the bitstream encoding method, and if the TNS step has been performed, performing temporal-noise shaping for controlling the temporal shape of the quantization noise within each window for conversion.

26. A computer usable medium, tangibly embodying a program of instructions executable by a machine to perform a scalable audio coding method for coding audio signals into a layered datastream having a base layer and enhancement layers of a predetermined number, the method comprising the steps of:

signal-processing input audio signals and quantizing the same for each predetermined coding band; and coding the quantized data corresponding to the base layer;

coding the quantized data corresponding to the next enhancement layer of the coded base layer and the remaining quantized data uncoded due to a layer size limit and belonging to the coded layer; and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a predetermined same number; and then arithmetic-coded using a predetermined probability model in the order ranging from the MSB sequences to the LSB sequences, while the bit-sliced left-channel data and the right-channel data are alternately coded into units of predetermined vectors.

27. The computer usable medium according to claim 26, wherein the side information contains at least scale factors and probability models to be used in the arithmetic coding, and the scale factor coding step comprises the steps of:

obtaining the maximum scale factor;

obtaining differences between the first scale factor and the maximum scale factor; and obtaining differences between the scale factors subsequent to the first scale factor and the immediately previous arithmetic-coded scale factors, mapping the differences into a predetermined value and arithmetic-decoding the mapped values.

28. The computer usable medium according to claim 26, wherein the predetermined vectors are four-dimensional vectors obtained by coupling four bit-sliced audio channel data into one vector, and the four-dimensional vectors are are divided into two subvectors according to prestates indicating whether non-zero bit-sliced frequency components are coded or not, to then be coded.

29. The computer usable medium according to claim 26, wherein the quantizing step comprises the steps of:

converting the input audio signals of a temporal domain into signals of a frequency domain;

coupling the converted signals as signals of predetermined scale factor bands by time/frequency mapping and calculating a masking threshold at each scale factor band;

performing temporal-noise shaping for controlling the temporal shape of the quantization noise within each window for conversion;

performing intensity stereo processing such that only the quantized information of a scale factor band for one of two channels is coded, and only the scale factor for the other channel is transmitted;

predicting frequency coefficients of the present frame;

performing M/S stereo processing for converting a left-channel signal and a right-channel signal into an additive signal of two signals and a subtractive signal thereof; and quantizing the signals for each predetermined coding band so that quantization noise of each band is smaller than the masking threshold.

30. The computer usable medium according to claim 26, wherein the quantized data is composed of sign data and magnitude data, and the steps of coding of the base layer and enhancement layers and forming bitstreams comprise the steps of:

arithmetic-coding the most significant digit sequences composed of most significant digits of the magnitude data;

coding sign data corresponding to non-zero data among the coded most significant digit sequences;

coding the most significant digit sequences among uncoded magnitude data of the digital data;

coding uncoded sign data among the sign data corresponding to non-zero magnitude data among coded digit sequences; and performing the magnitude coding step and the sign coding step on the respective digits of the digital data, the respective steps being alternately performed on the left-channel data and the right-channel data in units of predetermined vectors.

31. A computer usable medium, tangibly embodying a program of instructions executable by the machine to perform a scalable audio decoding method for decoding audio data coded to have layered bitrates, the method comprising the steps of:

analyzing data necessary for the respective modules in the bitstreams having a layered structure;

decoding at least scale factors and arithmetic-coding model indices and quantized data, in the order of creation of the layers in bitstreams having a layered structure, the quantized data decoded alternately for the respective channels by analyzing the significance of bits composing the bitstreams, from upper significant bits to lower significant bits;

restoring the decoded scale factors and quantized data into signals having the original magnitudes; and converting inversely quantized signals into signals of a temporal domain.

32. The computer usable medium according to claim 31, wherein the scalable audio decoding method further comprises the steps of:

performing M/S stereo processing for checking whether or not M/S stereo processing has been performed in the bitstream encoding method, and converting a left-channel signal and a right-channel signal into an additive signal of two signals and a subtractive signal thereof if the M/S stereo processing has been performed;

checking whether or not predicting step has been performed in the bitstream encoding method, and predicting frequency coefficients of the current frame if the checking step has been performed;

checking whether or not intensity stereo processing has been performed in the bitstream encoding method, and, if the intensity stereo processing has been performed, then since only the quantized information of the scale factor band for one channel (the left channel) two channels is coded, performing the intensity stereo processing for restoring the quantized information of the other channel (the right channel) into a left channel value; and checking whether or not temporal noise shaping (TNS) step has been performed in the bitstream encoding method, and if the TNS step has been performed, performing temporal-noise shaping for controlling the temporal shape of the quantization noise within each window for conversion.

33. The computer usable medium according to claim 31, wherein, when the quantized data is composed of sign data and magnitude data, restoring quantized frequency components by sequentially decoding the magnitude data of quantized frequency components sign bits and coupling the magnitude data and sign bits.

34. The computer usable medium according to claim 31, wherein the decoding step is performed from the most significant bits to the lowest significant bits and the restoring step is performed by coupling the decoded bit-sliced data and restoring the coupled data into quantized frequency component data.

35. The computer usable medium according to claim 34, wherein the data is decoded in the decoding step such that bit-sliced information of four samples is decoded into units of four-dimensional vectors, and the four-dimensional vector decoding is performed such that two subvectors coded according to prestates indicating whether non-zero bit-sliced frequency components are coded or not is arithmetic-decoded, and the two subvectors decoded according to the coding states of the respective samples are restored into four-dimensional vectors.

36. The computer usable medium according to claim 33, wherein while the bit-sliced data of the respective frequency components is decoded from the MSBs, decoding is skipped if the bit-sliced data is '0' and sign data is arithmetic-decoded when the bit-sliced data '1' appears for the first time.

37. The computer usable medium according to claim 31, wherein the decoding of the scale factors is performed by decoding the maximum scale factor in the bitstream, arithmetic-decoding differences between the maximum scale factor and the respective scale factors, and subtracting the differences from the maximum scale factor.

38. The computer usable medium according to claim 38, wherein the step of decoding the scale factors comprises the steps of:

decoding the maximum scale factor from the bitstreams;

obtaining differences between the maximum scale factor and scale factors to be decoded by mapping and arithmetic-decoding the differences and inversely mapping the differences from the mapped values; and obtaining the first scale factor by subtracting the differences from the maximum scale factor, and obtaining the scale factors for the remaining bands by subtracting the differences from the previous scale factors.

39. A scalable stereo audio encoding method for coding audio signals into a layered datastream having a base layer and at least two enhancement layers, comprising the steps of:

signal-processing input audio signals and quantizing the same for each predetermine coding band;

coding the quantized data of a first range of frequencies corresponding to the base layer among the quantized data;

coding the quantized data of a second range of frequencies corresponding to the next enhancement layer; and sequentially performing the layer coding steps for all enhancement layers to form bitstreams, wherein the base layer coding step, the enhancement layer coding step and the sequential coding step are performed such that the side information and quantized data corresponding to a layer to be coded are represented by digits of a same predetermined number; and then arithmetic-coded using a predetermined probability model in the order ranging from the MSB sequences to the LSB sequences, bit-sliced left-channel data and right-channel data being alternately coded in units of predetermined vectors.

40. The scalable audio coding method according to claim 39, said second range of frequencies includes frequencies different from said first range of frequencies wherein the most significant digits of the quantized data of said frequencies different from said first range of frequencies are coded before coding next significant digits of the quantized data belonging to the corresponding enhancement layer.

41. The scalable stereo audio encoding method according to claim 40, wherein the side information includes at least scale factors and information on a probability model to be used in arithmetic-coding.

42. The scalable stereo audio encoding method according to claim 40, wherein the predetermined vectors are four-dimensional vectors produced by coupling the four bit-sliced audio channel data into one vector.

43. The scalable stereo audio encoding method according to claim 42, wherein the four-dimensional vectors are divided into two subvectors according to prestates indicating whether non-zero bit-sliced frequency components are coded or not, to then be coded.

44. The scalable stereo audio encoding method according to claim 41, wherein the step of coding the scale factors comprises the steps of:

obtaining the maximum scale factor;

obtaining the difference between the maximum scale factor and the first scale factors and arithmetic-coding the difference; and obtaining differences between the immediately previous arithmetic-coded scale factor and the respective scale factors subsequent to the first scale factor, mapping the differences into a predetermined value and arithmetic-coding the mapped values.

45. The scalable stereo audio encoding method according to claim 44, wherein the probability models listed in Table 5.1 are used in the mapping step.

46. The scalable stereo audio encoding method according to claim 41, wherein the step of coding the scale factors comprises the steps of:

obtaining the maximum scale factor; and obtaining differences between the maximum scale factor and the respective scale factors and arithmetic-coding the differences.

47. The scalable stereo audio encoding method according to claim 40, wherein the header information commonly used for all bands is coded and the side information and the quantized frequencies necessary for the respective layer are formed by bit-sliced information to then be coded to have a layered structure.

48. The scalable stereo audio encoding method according to claim 40, wherein the quantization is performed by the steps of:

converting the input audio signals of a temporal domain into signals of a frequency domain;

coupling the converted signals as signals of predetermined scale factor bands by time/frequency mapping and calculating a masking threshold at each scale factor band;

performing temporal-noise shaping for controlling the temporal shape of the quantization noise within each window for conversion;

performing intensity stereo processing such that only the quantized information of a scale factor band for one of two channels is coded, and only the scale factor for the other channel is transmitted;

predicting frequency coefficients of the present frame;

performing M/S stereo processing for converting a left-channel signal and a right-channel signal into an additive signal of two signals and a subtractive signal thereof; and quantizing the signals for each predetermined coding band so that quantization noise of each band is smaller than the masking threshold.

49. The scalable stereo audio encoding method according to claim 40, wherein, when the quantized data is composed of sign data and magnitude data, the steps of coding of the base layer and enhancement layers and forming bitstreams comprise the steps of:

arithmetic-coding the most significant digit sequences composed of most significant digits of the magnitude data;

coding sign data corresponding to non-zero data among the coded most significant digit sequences;

coding the most significant digit sequences among uncoded magnitude data of the digital data;

coding uncoded sign data among the sign data corresponding to non-zero magnitude data among coded digit sequences; and performing the magnitude coding step and the sign coding step on the respective digits of the digital data, the respective steps being alternately performed on the left-channel data and the right-channel data in units of predetermined vectors.

* * * * *